United States Patent
Kuno

(10) Patent No.: US 8,254,001 B2
(45) Date of Patent: Aug. 28, 2012

(54) COLOR GAMUT DATA CREATING DEVICE FOR IMAGE FORMING APPARATUS CREATING COLOR GAMUT DATA TO INDICATE DISTRIBUTION RANGE OF MEASUREMENT POINTS PROJECTED ON EACH TARGET PLANE

(75) Inventor: Masashi Kuno, Obu (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 979 days.

(21) Appl. No.: 12/198,629

(22) Filed: Aug. 26, 2008

(65) Prior Publication Data

US 2009/0059253 A1 Mar. 5, 2009

(30) Foreign Application Priority Data

Aug. 27, 2007 (JP) ................................. 2007-220196

(51) Int. Cl.
  G03F 3/08 (2006.01)
  G06K 9/00 (2006.01)
(52) U.S. Cl. ......... 358/520; 358/1.9; 358/515; 358/516; 358/518; 382/167; 382/162; 382/163
(58) Field of Classification Search .................... None
See application file for complete search history.

(56) References Cited

U.S. PATENT DOCUMENTS

| | | | |
|---|---|---|---|
| 5,416,890 A * | 5/1995 | Beretta | 345/590 |
| 5,450,216 A * | 9/1995 | Kasson | 358/518 |
| 5,574,666 A | 11/1996 | Ruetz et al. | |
| 5,704,026 A | 12/1997 | Wan | |
| 5,721,572 A | 2/1998 | Wan et al. | |
| 6,297,826 B1 * | 10/2001 | Semba et al. | 345/589 |
| 6,373,595 B1 * | 4/2002 | Semba et al. | 358/1.9 |
| 6,594,388 B1 * | 7/2003 | Gindele et al. | 382/167 |
| 6,791,716 B1 * | 9/2004 | Buhr et al. | 358/1.9 |
| 6,850,342 B2 * | 2/2005 | Woolfe et al. | 358/1.9 |
| 6,897,988 B1 * | 5/2005 | Saito et al. | 358/515 |
| 7,167,277 B2 * | 1/2007 | Shimizu et al. | 358/1.9 |
| 2004/0096104 A1 | 5/2004 | Terekhov | |

FOREIGN PATENT DOCUMENTS

| | | |
|---|---|---|
| JP | H07-030774 | 1/1995 |
| JP | H07-323614 | 12/1995 |
| JP | 2000-101863 | 4/2000 |
| JP | 2004-64798 | 2/2004 |
| JP | 2006-180062 | 7/2006 |

* cited by examiner

Primary Examiner — Steven Kau
(74) Attorney, Agent, or Firm — Scully, Scott, Murphy & Presser, P.C.

(57) ABSTRACT

A color gamut data creating device includes a target plane determining unit. The measurement points are defined in a color space. The color space has an achromatic axis and an axis perpendicular to the achromatic axis. The target plane determining unit further determines a plurality of target planes. Each target plane has a fixed hue angle and including the chromatic axis. A difference between a maximum saturation at a hue angle of each target plane and a maximum saturation at a hue angle of another target plane that is adjacent to the each target plane is lower than a prescribed value. The locating unit that projects, on each target plane, those measurement points that are within a prescribed range relative to the subject target plane. The color gamut creating unit creates color gamut data indicative of a distribution range of the measurement points projected on each target plane.

10 Claims, 17 Drawing Sheets

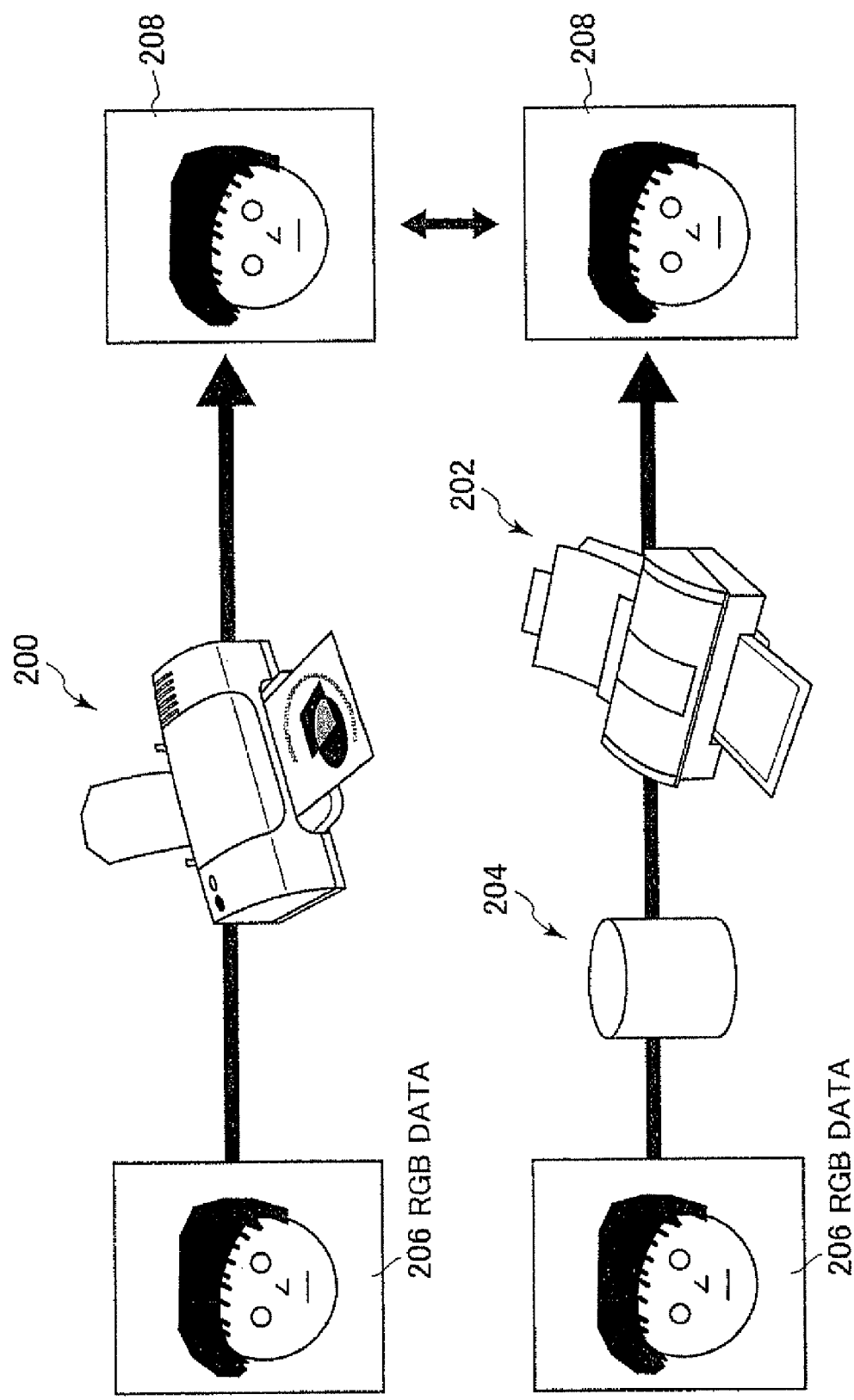

(PROCESS IN COLOR DATA PROCESSOR)

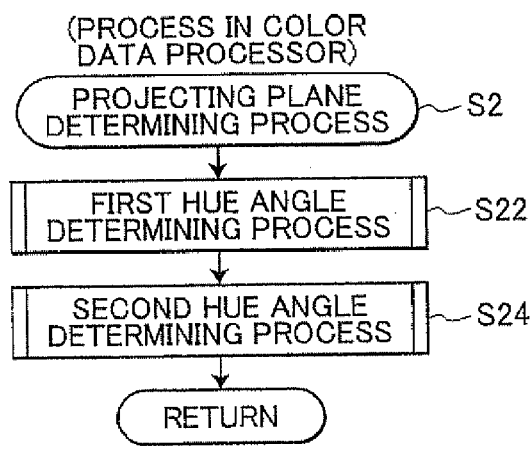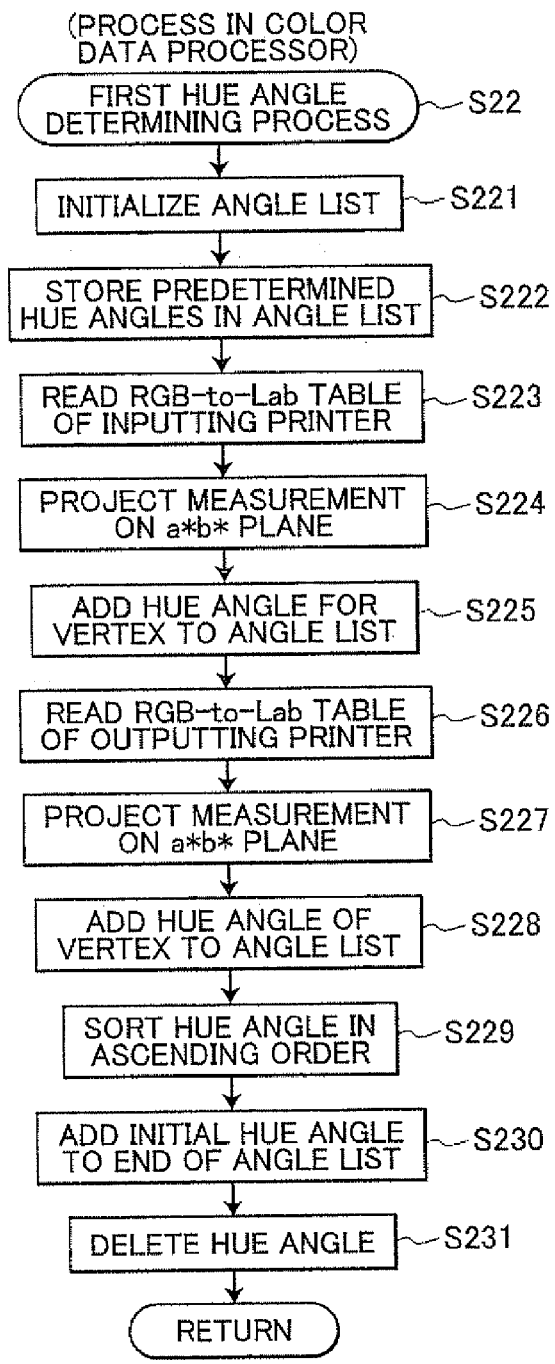

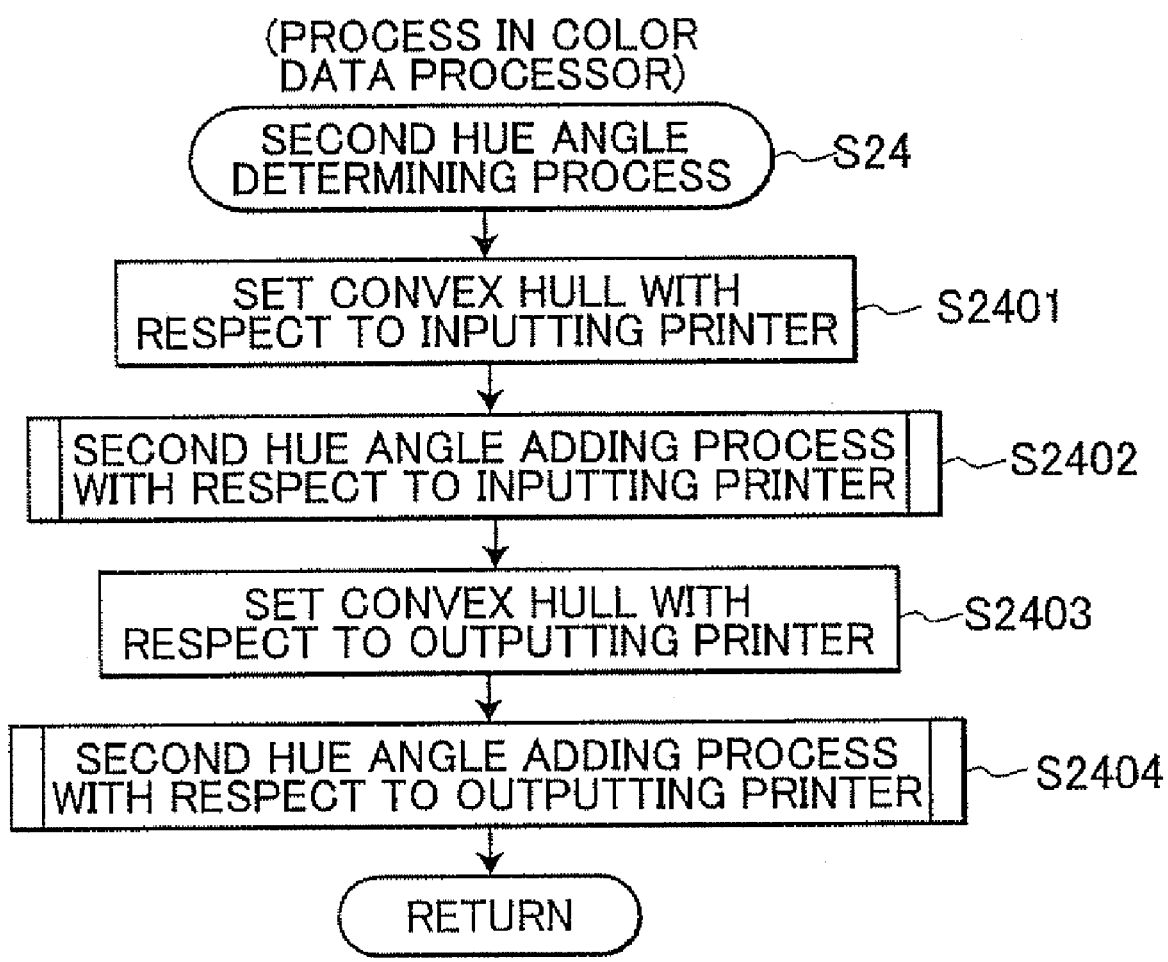

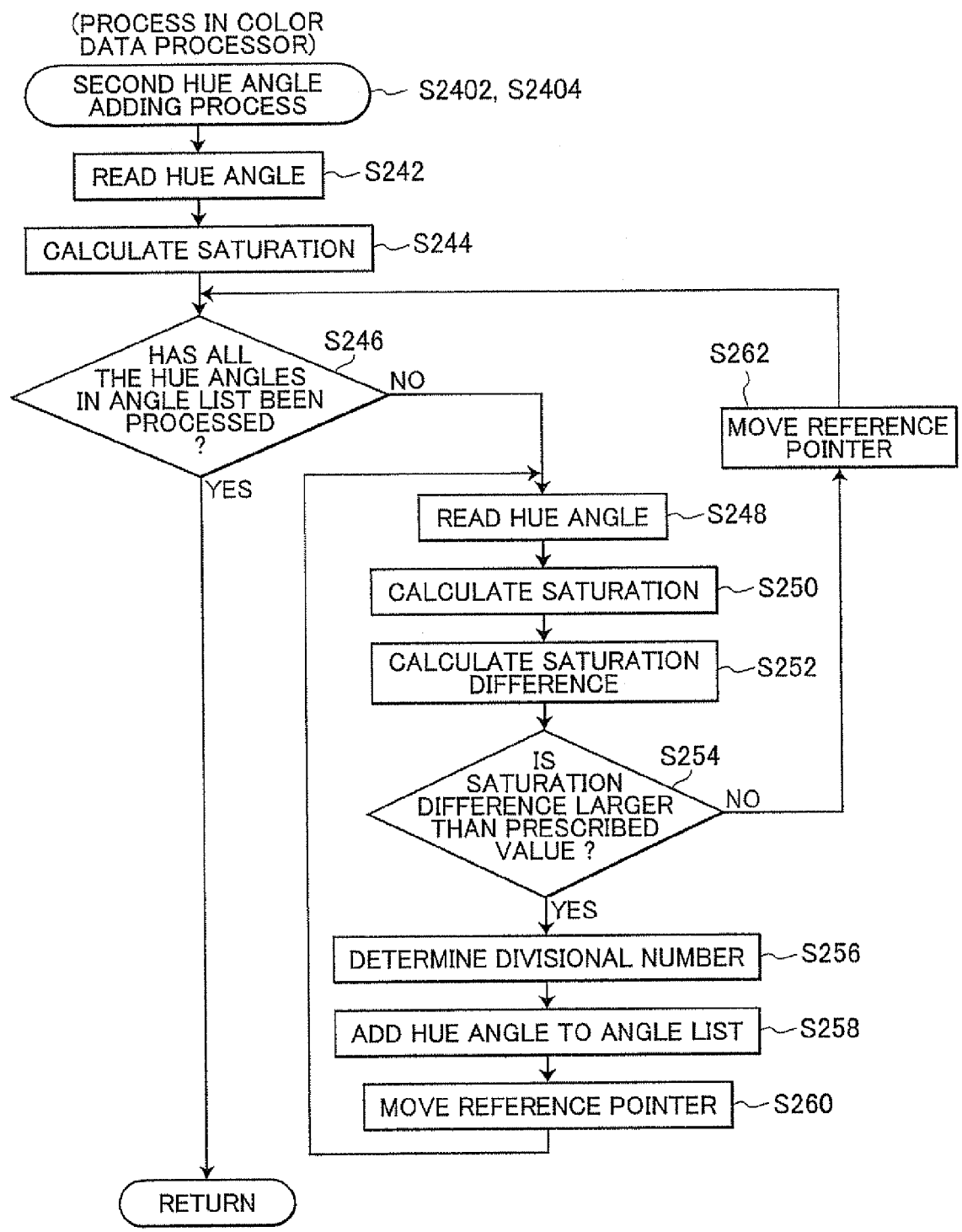

COLOR GAMUT DATA CREATING DEVICE FOR IMAGE FORMING APPARATUS CREATING COLOR GAMUT DATA TO INDICATE DISTRIBUTION RANGE OF MEASUREMENT POINTS PROJECTED ON EACH TARGET PLANE

CROSS REFERENCE TO RELATED APPLICATION

This application claims priority from Japanese Patent Application No. 2007-220196 filed Aug. 27, 2007. The entire content of the priority application is incorporated herein by reference.

TECHNICAL FIELD

The present invention relates to a color gamut data creating device and a color gamut data creating method capable of creating color gamut data.

BACKGROUND

There have been known systems including an input device for inputting an image and an output device for outputting the image. Japanese Patent Application Publication No. 2006-180062 discloses a system implementing a color matching process (gamut compression) to correct differences in appearance between the input image and the output image caused by discrepancies between the color-reproducible ranges (gamuts) of the input device and output device.

SUMMARY

Here, a conventional color matching process will be described with reference to FIG. 1, which conceptually illustrates the color matching system. The color matching system shown in FIG. 1 includes an inputting printer 200 serving as the input device, an outputting printer 202 serving as the output device, and a color matching device 204. When an external device, such as a personal computer, inputs RGB data 206 into the inputting printer 200 and outputting printer 202, the printers 200 and 202 each form an image on recording paper 208 based on the RGB data 206.

If the range of colors (gamut) that can be reproduced by the outputting printer 202 is more restricted than the reproducible range of the inputting printer 200 for any reason, such as the inputting printer 200 being a superior model to the outputting printer 202, then there exist colors that can be produced with the inputting printer 200 but not with the outputting printer 202. As a result, even if the same RGB data 206 is inputted into both printers 200 and 202, the overall-appearance of the images formed on the recording papers 208 by the printers will differ.

The color matching device 204 performs a process for acquiring the color gamut of the inputting printer 200 and the color gamut of the outputting printer 202, for comparing these color gamuts in order to create a calibration table for calibrating the differences in the gamuts, and for subsequently calibrating output data for the outputting printer 202 based on the calibration table to produce a similar overall appearance of images formed on the two printers.

Here, the above process will be described with reference to FIGS. 2(a) and 2(b) up to the point that the color matching device 204 acquires gamuts of the printers. FIG. 2(a) conceptually illustrates the conventional inputting printer 200, the RGB data 206 for a test pattern inputted into the inputting printer 200, and the recording paper 208 on which the inputting printer 200 forms color patches based on the inputted RGB data 206. A colorimeter can then be used to measure colors in the color patches formed on the recording paper 208 and quantifies the measured color in a desired color coordinate system.

FIG. 2(b) shows color values obtained by measuring the color patches that have been plotted in the L*a*b* color space. Points plotted in this color space based on the measured color values will be referred to as measurement points. The color gamut of the inputting printer 200 can be identified from the distributed range of measurement points in the color space. For example, the color gamut is determined by a computer using a well known flexible sequential LGB method (hereinafter, referred as FSLGB method). FIGS. 3(a)-3(b) illustrate this FSLGB method for representing a color gamut with a convex hull.

FIG. 3(a) illustrates a distribution range 213 of measurement points in an L*a*b* color space 210. A plurality of projecting planes 214 are set in the FSLGB method in order to express a distribution range of the measurement points numerically. FIG. 3(b) shows only one of the projecting planes 214 for simplicity.

In the FSLGB method, the measurement points located in proximity of the projecting plane 214 are projected onto the projecting plane 214. That is, the measurement points that are distributed in the color space at locations in the proximity of the two-dimensional projecting plane 214 are projected onto the two dimensional plane 214. The color gamut is calculated for the measurement points that are now expressed in two dimensions on the two-dimensional planes 214.

FIG. 3(c) illustrates a distribution of the measurement points projected on the projecting plane 214. The distribution range of the measurement points corresponds to the color gamut 216 on the projecting plane 214. In the FSLGB method, the projecting planes 214 are set at regular intervals of hue angle from 0° to 360°. The color gamut 216 is determined for each projecting plane 214 to express the color gamut of the device.

FIG. 4 shows an a*b* plane viewed from above the L*a*b* color space 210 along the L* axis. Although only two projecting planes 214B and 214C are shown for simplicity in FIG. 4, a plurality of projecting planes 214 are set at regular intervals. According to the FSLGB method, measurement points whose hue angels are within the range from $\phi_B - \alpha$ to $\phi_B + \alpha$ are all projected on the projecting plane 214B at hue angle $\phi_B$. It is noted that when one measurement point is projected onto a projecting plane, the measurement point is projected on the projecting plane at such a location that a line connecting the measurement point and the location, at which the measurement point is projected, is normal to the projecting plane Based on the measurement points thus projected on the projected plane 214B, the color gamut on this projecting plane 214B is created. The color gamut on this plane 214B is equivalent to the color gamut for the hue angle from $\phi_B \alpha$ to $\phi_B + \alpha$.

A saturation distribution range 218 encompasses all the measurement points therein. A distance of a point from a point of origin in the a*b* plane denotes color saturation. The saturation distribution range 218 in FIG. 4 expresses the maximum color saturation for each hue. In other words, the saturation distribution range 218 represents the maximum saturation that can be reproduced by a device at each hue angle. In the saturation distribution range 218 as shown in FIG. 4, the maximum saturation changes rapidly as the hue changes between the projecting planes 214B and 214C.

As described above, the measurement points positioned within the hue angle range from $\phi_B-\alpha$ to $\phi_B+\alpha$ are projected onto the projecting plane 214B having the hue angle $\phi_B$. Similarly, measurement points positioned within the range form $\phi_C-\alpha$ to $\phi_C+\alpha$ are projected onto the projecting plane 214c having the hue angle $\phi_C$. So, a measurement point at a point 220 is projected on either one of the projecting planes 214B and 214C.

If the point 220 is projected on the projecting plane 214B, a larger color gamut than the actual color gamut will be created for the projecting plane 214B. This is because the projected point of the point 220 has a higher saturation than the actual maximum saturation that can be attained on the projecting plane 214B.

While it is possible to suppress this problem to some degree by providing projecting planes densely, increasing the number of projecting planes leads to a longer processing time for calculating the color gamuts of all the hues and requires a large memory capacity for storing this color gamut data.

It is an object of the invention to provide a color gamut data creating device and a color gamut data creating method capable of creating color gamut data that accurately expresses the color gamut of a device.

In order to attain the above and other objects, the invention provides a color gamut data creating device. The color gamut data creating device includes a receiving unit, a target plane determining unit, a locating unit, and a color gamut creating unit. The receiving unit receives measurement points concerning an image forming device. The measurement points are defined in a color space. The color space has an achromatic axis and an axis perpendicular to the achromatic axis. The color space represents hue by a hue angle defined from the axis perpendicular to the achromatic axis, represents lightness along the achromatic axis, and represents saturation by a distance from the achromatic axis. The target plane determining unit determines a saturation distribution based on the measurement points. The saturation distribution defines a maximum saturation reproducible by the image forming device at each of a plurality of hue angles. The target plane determining unit further determines a plurality of target planes. Each target plane has a fixed hue angle and including the chromatic axis. A difference between a maximum saturation at a hue angle of each target plane and a maximum saturation at a hue angle of another target plane that is adjacent to the each target plane is lower than a prescribed value. The locating unit that projects, on each target plane, those measurement points that are within a prescribed range relative to the subject target plane. The color gamut creating unit creates color gamut data indicative of a distribution range of the measurement points projected on each target plane.

According to another aspects, the invention provides a color gamut data creating device. The color gamut data creating data creating device includes a receiving unit, a target plane determining unit, and a color gamut creating unit. The receiving unit receives measurement points concerning an image forming device. The measurement points is defined in a color space. The color space is represented by a cylindrical coordinate whose axis is set to a reference line. The cylindrical coordinate defines, as a radius, a distance from the reference line. The target plane determining unit determines a distribution of radius based on the measurement points. The target plane determining unit further determines a plurality of target planes each of which includes the reference line. The distribution of radius defines a maximum radius reproducible by the image forming device at each of the plurality of target planes. A difference between a maximum radius on each target plane and a maximum radius on another target plane adjacent to the each target plane is lower than a prescribed value. The color gamut creating unit creates color gamut data indicative of a distribution range of the measurement points projected on each target plane.

According to still another aspects, the invention provides a color gamut data creating method. The color gamut data creating method includes receiving measurement points concerning an image forming device wherein the measurement points is defined in a color space, wherein the color space has an achromatic axis and an axis perpendicular to the achromatic axis, wherein the color space represents hue by a hue angle defined from the axis perpendicular to the achromatic axis, represents lightness along the achromatic axis, and represents saturation by a distance from the achromatic axis, determining a saturation distribution based on the measurement points, wherein the saturation distribution defines a maximum saturation reproducible by the image forming device at each of a plurality of hue angles, determining a plurality of target planes, wherein each target plane has a fixed hue angle and including the achromatic axis, wherein a difference between a maximum saturation at a hue angle of each target plane and a maximum saturation at a hue angle of another target plane that is adjacent to the each target plane is lower than a prescribed value, projecting, on each target plane, those measurement points that are within a prescribed range relative to the subject target plane, and creating color gamut data indicative of a distribution range of the measurement points projected on each target plane.

According to still another aspects, the invention provides a computer-readable storage medium storing a set of program instructions executable on a computer. The program instructions includes receiving measurement points concerning an image forming device wherein the measurement points is defined in a color space, wherein the color space has an achromatic axis and an axis perpendicular to the achromatic axis, wherein the color space represents hue by a hue angle defined from the axis perpendicular to the achromatic axis, represents lightness along the achromatic axis, and represents saturation by a distance from the achromatic axis, determining a saturation distribution based on the measurement points, wherein the saturation distribution defines a maximum saturation reproducible by the image forming device at each of a plurality of hue angles, determining a plurality of target planes, wherein each target plane has a fixed hue angle and including the achromatic axis, wherein a difference between a maximum saturation at a hue angle of each target plane and a maximum saturation at a hue angle of another target plane that is adjacent to the each target plane is lower than a prescribed value, projecting, on each target plane, those measurement points that are within a prescribed range relative to the subject target plane, and creating color gamut data indicative of a distribution range of the measurement points projected on each target plane.

BRIEF DESCRIPTION OF THE DRAWINGS

Embodiments in accordance with the invention will be described in detail with reference to the following figures wherein:

FIG. 1 conceptually illustrates a conventional color matching system;

FIG. 3(b) illustrates the conventional method of projecting measurement points on a projecting plane in the L*a*b* color space, and FIG. 3(c) illustrates the conventional method of representing a color gamut based on the measurement points projected on the projecting plane;

FIG. 10(a) is a flowchart illustrating steps in a projecting plane determining process;

FIG. 10(b) is a flowchart illustrating steps in a first hue angle determining process;

FIG. 11(a) is a flowchart illustrating steps in a second hue angle determining process;

FIG. 11(b) is a flowchart illustrating steps in a second hue angle adding process;

DETAILED DESCRIPTION

Figure 2A:
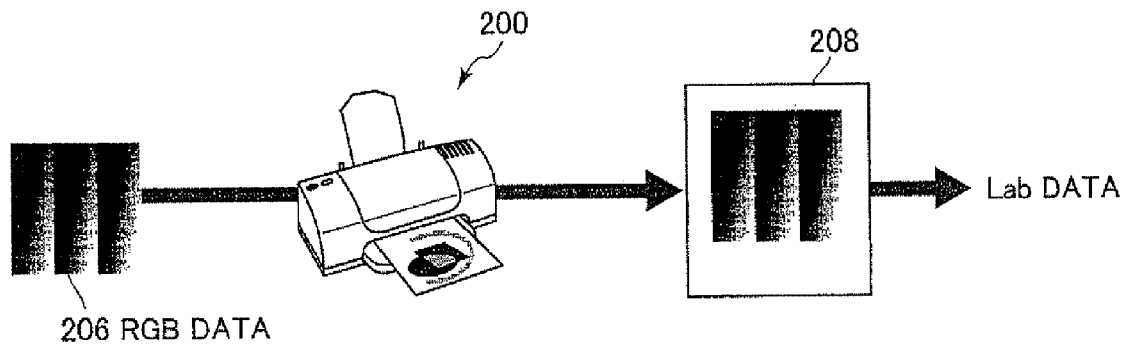
FIG. 2(a) conceptually illustrates a conventional inputting printer, RGB data for a test pattern inputted into the inputting printer, and a recording paper on which the inputting printer forms color patches based on the inputted RGB data.
Figure 2B:
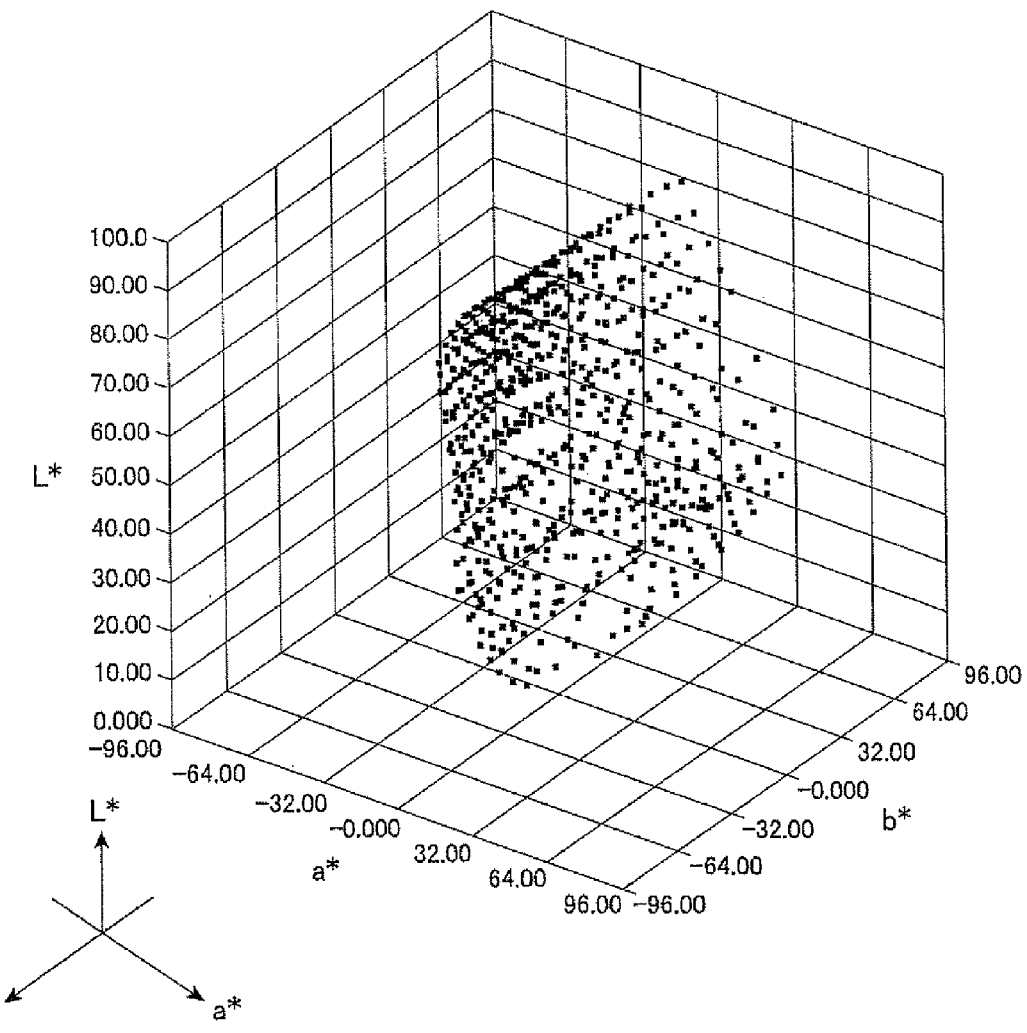
FIG. 2(b) shows color values that are obtained by measuring color patches and plotted in an L*a*b* color space.
Figure 3A:
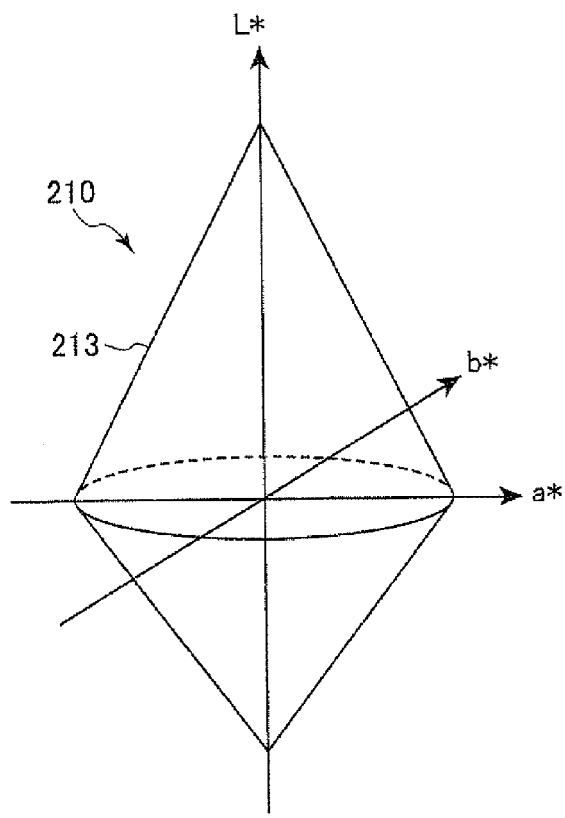
FIGS. 3(a)-3(c) illustrate a conventional method of representing a color gamut for a projecting plane in the L*a*b* color space, wherein FIG. 3(a) illustrate a distribution range of measurement points located in an L*a*b* color space three-dimensionally.
Figure 3C:
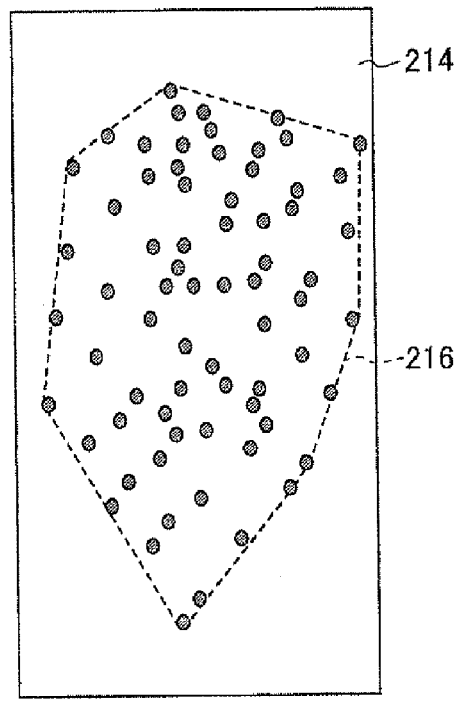
Figure 3B:
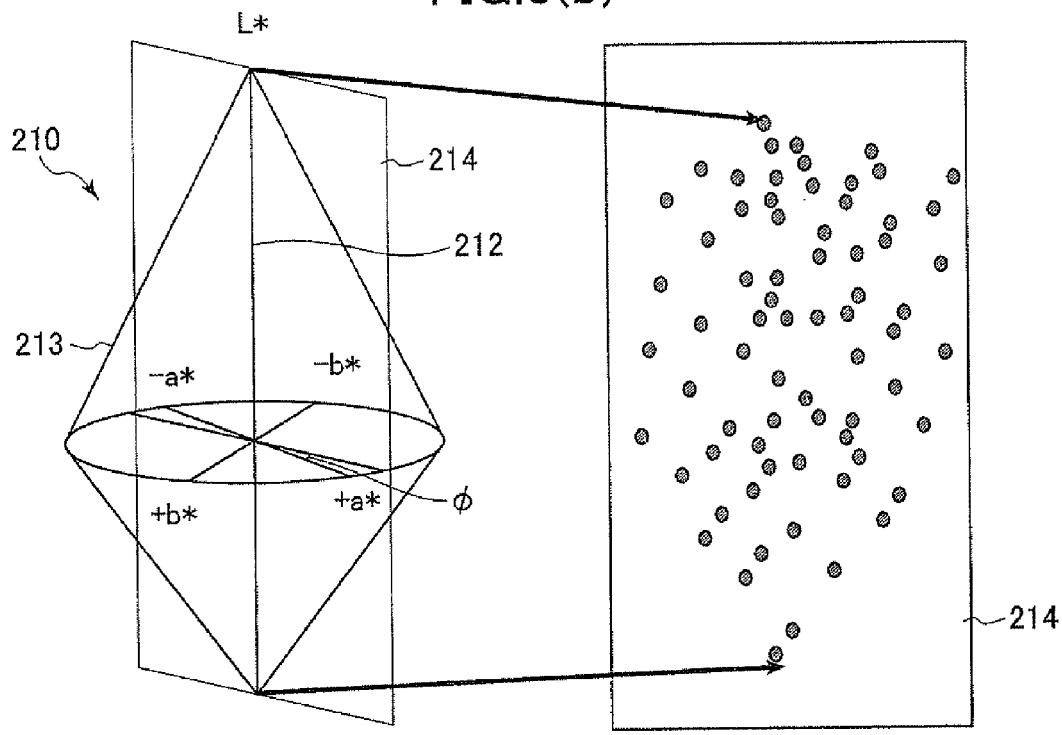
Figure 4:
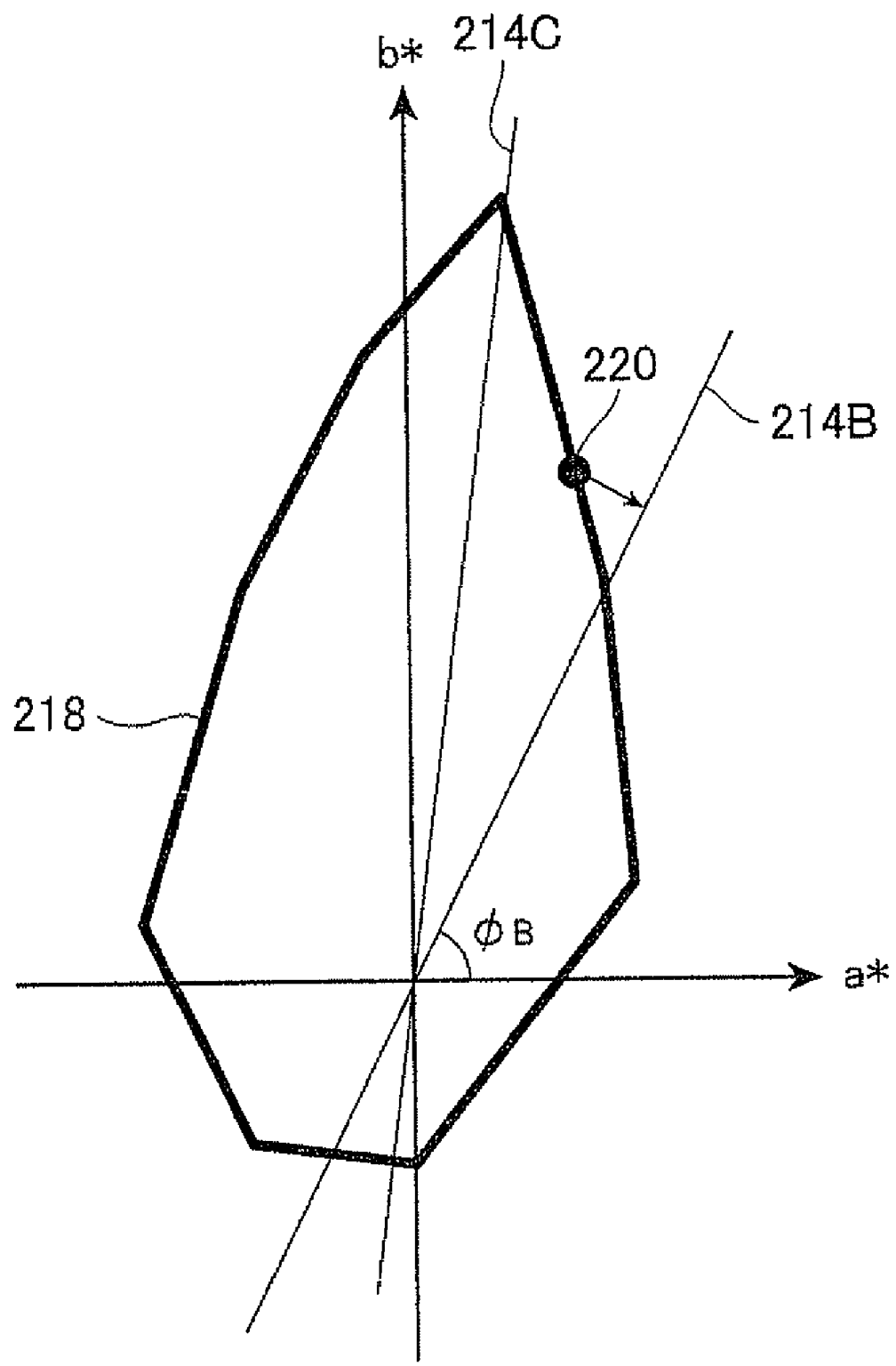
FIG. 4 shows an a*b* plane viewed from above the La*b* color space, and projecting planes that are arranged at a fixed hue angular interval.
Figure 5:
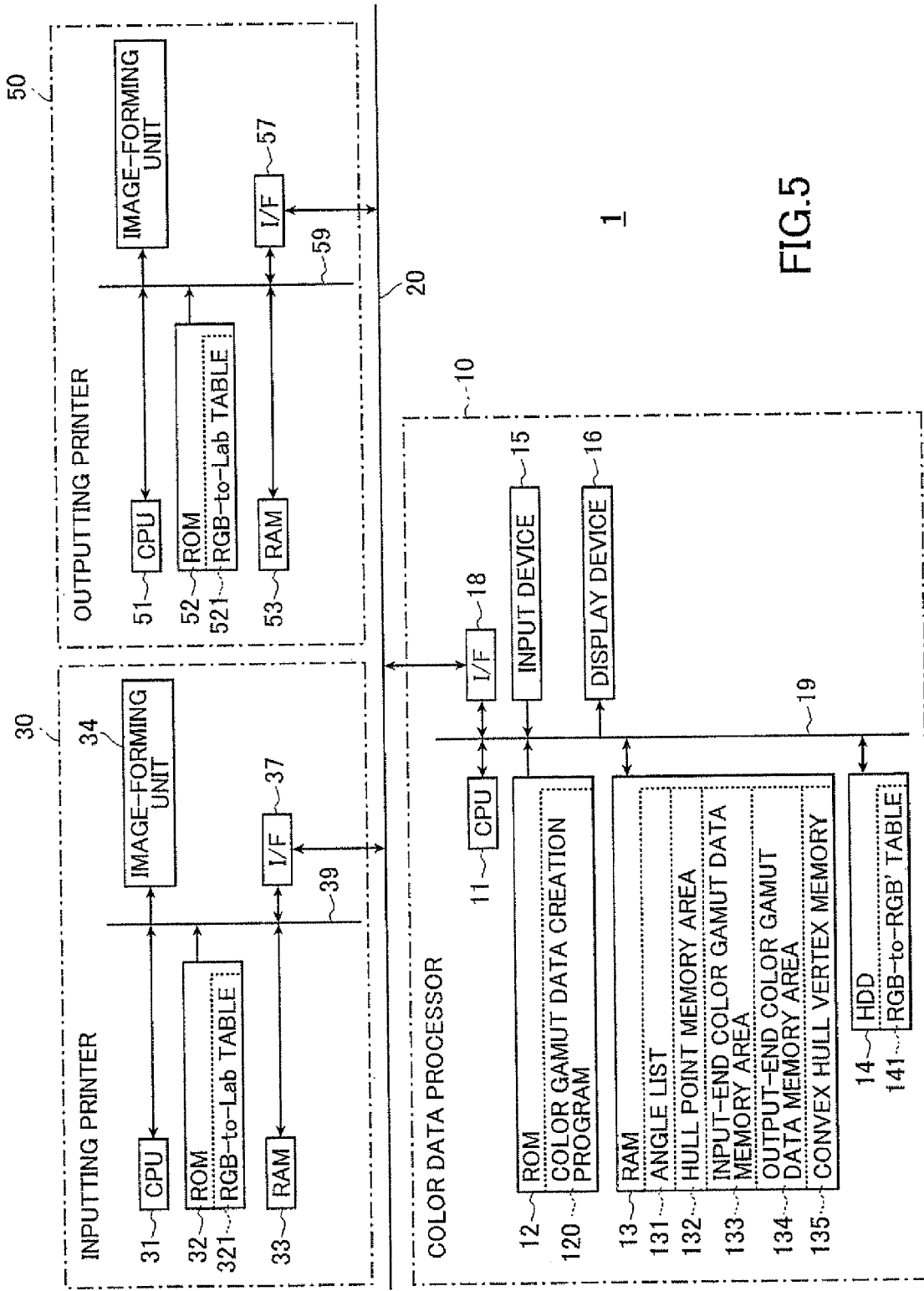
FIG. 5 is a block diagram showing an overall structure of a color data processing system provided with a color data processor according to an embodiment.

Next, an embodiment of the invention will be described while referring to the accompanying drawings. FIG. 5 is a block diagram showing the overall structure of a color data processing system 1 provided with a color data processor 10, which is the embodiment of the color gamut data creating device according to the invention. The color data processing system as shown in FIG. 5 includes the color data processor 10, and an inputting printer 30 and an outputting printer 50 connected to the color data processor 10. The color data processor 10 can create a color gamut for the devices 30 and 50 accurately. Based on the created color gamuts, the color data processor 10 performs a color data conversion process to make the overall appearance of images formed on the inputting printer 30 similar to the overall appearance of images formed on the outputting printer 50.

As shown in FIG. 5, the color data processor 10 includes a CPU 11, a ROM 12, a RAM 13, a hard disk drive (HDD) 14, an input device 15, a display device 16, and a network interface 18.

The CPU 11 is a central processing unit performing overall control of the color data processor 10. The CPU 11 executes a program to implement the process shown in the flowcharts of FIGS. 9-12.

The ROM 12 is a non-rewritable memory storing various control programs executed by the CPU 11 and data required by the CPU 11 to execute these control programs. Particularly, the ROM 12 stores a color gamut forming program 120 used to implement a process described in the flowcharts of FIGS. 9 to 12.

The RAM 13 functions to temporarily store data and programs required by the CPU 11 to execute various processes. The RAM 13 includes an angle list 131, a hull point memory area 132, an input-end color gamut data memory area 133, and an output-end color gamut data memory area 134, and a convex hull vertex memory 135.

The angle list 131 is for storing a list describing hue angles of a plurality of projecting planes 64. The hull point memory 132 is for storing hull points 67.

Figure 6A:
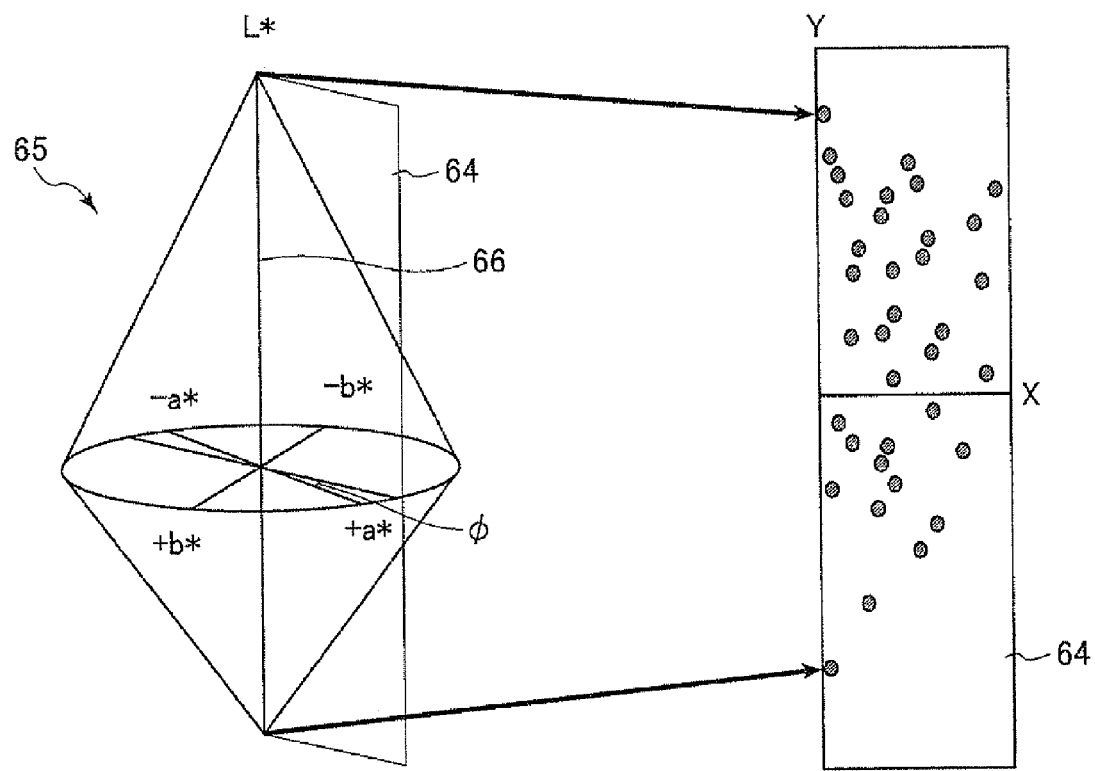
FIG. 6(a) is an explanatory diagram illustrating how to project measurement points on a projecting plane in a L*a*b* color space.

The projecting planes 64 and the hull points 67 are described below while referring to FIGS. 6(a)-6(c). The left side in FIG. 6(a) illustrates a color space 65 defined in an L*a*b* color coordinate system three-dimensionally. As shown in the left side of FIG. 6(a), the color space 65 has an achromatic axis 66 showing lightness. A distance from the achromatic axis expresses saturation in the color space 65. A hue angle φ expresses a hue in the color space 65. The hue angle φ is defined as a counterclockwise angle from a positive direction of an a* axis. Here, the hue angel φ of the a* axis is set to 0°.

The color data processor 10 according to the embodiment creates color gamut data by using a flexible sequential LGB method (hereinafter, referred to as FSLGB method). More specifically, a plurality of projecting planes 64 is defined in the color space 65. It is noted that only one projecting plane 64 is shown in FIG. 6(a) for simplicity. As shown in the left side of FIG. 6(a), each projecting plane 64 includes the achromatic axis (L* axis) 66. Each projecting plane 64 is defined by a corresponding single hue angle φ. Measurement points that are disposed within a prescribed range with respect to each projecting plane 64, are projected on the subject projecting plane 64. The right side of FIG. 6(a) shows the measurement points projected on the projecting plane 64. A color gamut is created with respect to each projecting plane 64. The color gamut indicates a distribution range of the measurement points projected on the projecting plane 64.

Figure 6B:
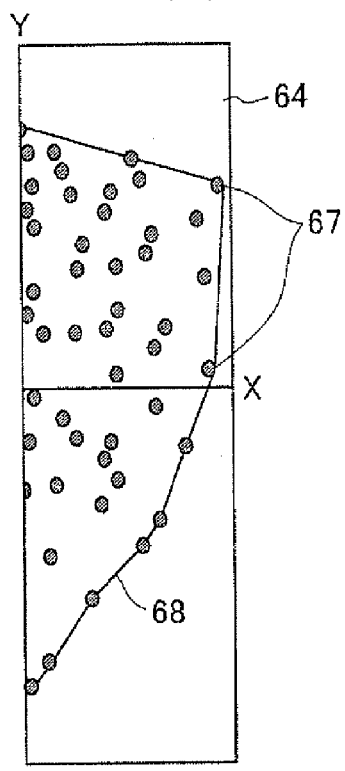
FIG. 6(b) shows how to determine hull points in the projecting plane.

In order to create the color gamut, hull points 67 are determined on the projecting plane 64, as shown in FIG. 6(b). The hull points 67 are measurement points that are located on the outermost periphery of all the measurement points projected on the projecting plane 64. The hull points 67 are connected with one another to define a hull boundary of a polygon shaped region in which all the measurement points are located.

More specifically, the color data processor 10 defines a plurality of projecting planes 64 and projects all measurement points within a prescribed range relative to each projecting plane 64 onto the subject projecting plane 64. Next, the color data processor 10 finds hull points 67 among the measurement points projected onto the projecting plane 64. The hull points 67 are stored in the hull point memory area 132. The data processor 10 creates the color gamut 68 by using the hull points 67 as described later with referring to FIGS. 9-12.

Returning to FIG. 5, the input-end color gamut data memory area 133 is for storing color gamut data representing the color gamut 68 for the inputting printer 30. The output-end color gamut data memory area 134 is for storing color gamut data representing the color gamut 68 for the outputting printer 50. The color data processor 10 according to the embodiment uses a polar coordinate system to represent the outer surface of the color gamut 68 determined based on the hull points 67.

Figure 6C:
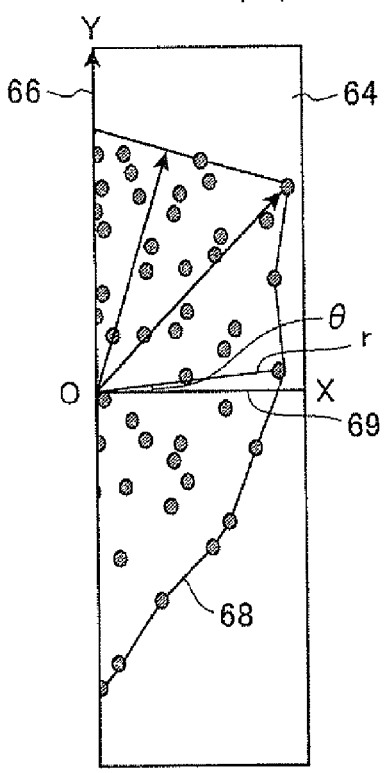
FIG. 6(c) illustrates a polar coordinate system representing a surface (hull) of a color gamut.

FIG. 6(c) illustrates the polar coordinate system representing the outer surface of the color gamut 68. As shown in FIG. 6(c), one point on the achromatic axis 66 is set as a point of origin O, for example, a point at L*=50. The surface of the color gamut 68 can be represented by a radius r representing the distance from the point of origin O, and an angle of deviation θ from an OX axis 69 that is orthogonal to the achromatic axis 66. Polar coordinate data includes data of the radius r and angle of deviation θ and indicates the position of the outer surface of the color gamut 68. The polar coordinate data is created as color gamut data representing the color gamut 68. Color gamut data indicative of a color gamut of the inputting printer 30 is stored in the input-end color gamut data memory area 133. Color gamut data indicative of a color gamut of the outputting printer 50 is stored in the output-end color gamut data memory area 134.

Returning to FIG. 5, the convex hull vertex memory 135 is for storing vertices of a polygon (convex hull 62) that represents a distribution range of saturation of the measurement points in the color space 65.

Figure 7:
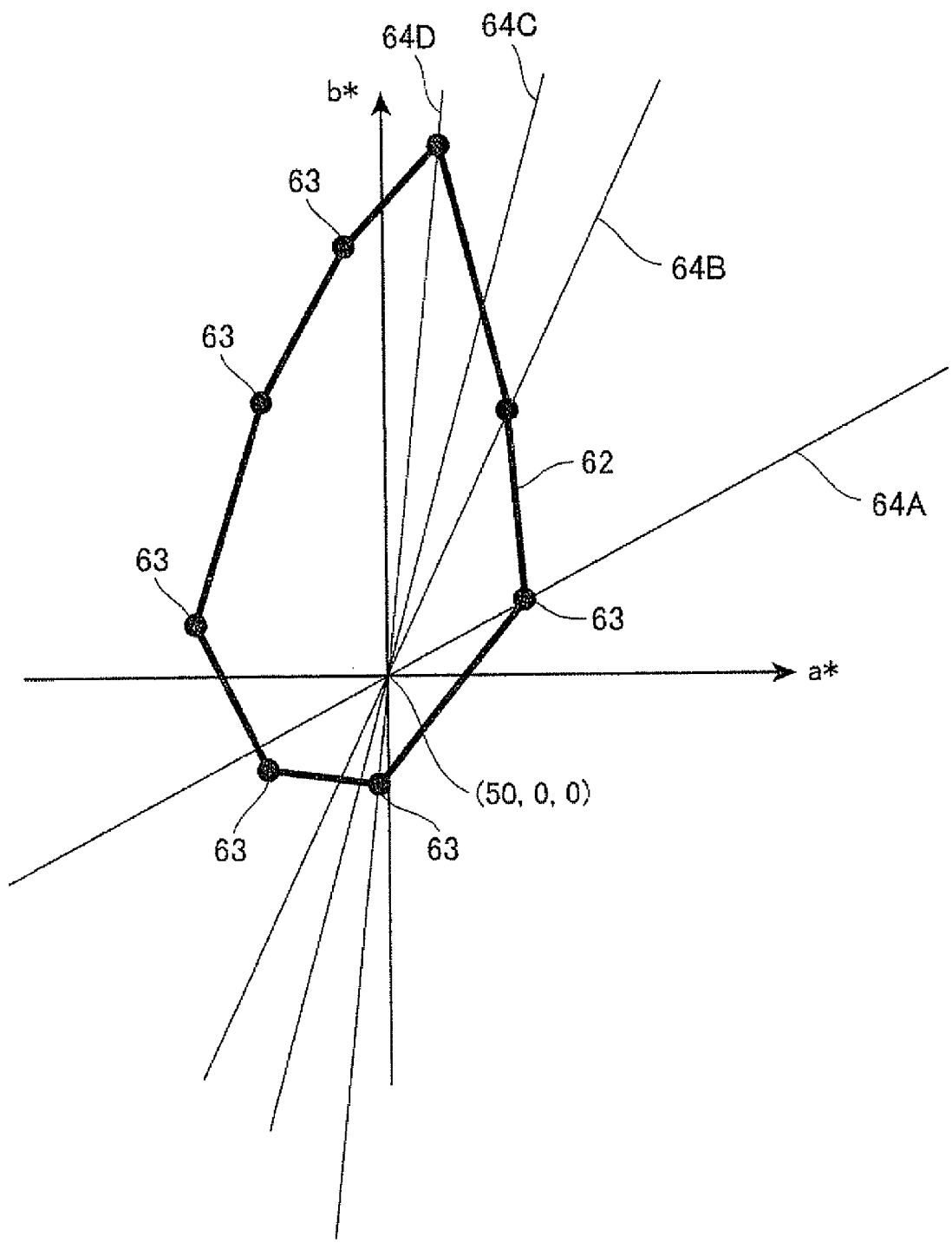
FIG. 7 shows an example a*b* plane in the L*a*b* color space.

FIG. 7 illustrates an a*b* plane 61 that is orthogonal to the achromatic axis 66 in the color space 65 (see FIG. 6(a)) represented by the L*a*b* color coordinate system. All the measurement points located in the color space 65 are projected on the a*b* plane. As shown in FIG. 7, the convex hull 62 is defined to encompass all the measurement points projected on the a*b* plane 61. The convex hull 62 is a polygon configured by connecting vertices 63, each of which is one of the measurement points projected on the a*b* plane 61.

A point of origin of the a*b* plane is defined as a point (L*, a*, b*)=(50, 0, 0). A value of maximum saturation at each hue angle is defined by a distance from the point of origin to the outer surface of the convex hull 62 at the subject hue angle. It is apparent from FIG. 7 that the maximum saturation value protrudes more outwardly at the hue of each vertex 63 than at other neighboring hues.

The data processor 10 according to the embodiment determines the hue angle ϕ at each vertex 63 of the convex hull 62, and stores the determined hue angle ϕ in the angle list 131. So, as shown in FIG. 7, the data processor 10 can set the projecting planes 64A, 64B, and 64D at those hues in which maximum saturation protrudes more outwardly than other hues. This prevents a measurement point that has extremely high saturation relative to other measurement points from being projected on a projecting plane 64 that has a hue angle different from that of the measurement point. Accordingly, the data processor 10 prevents the measurement point from effecting a color gamut at a hue angle that is different from a hue angle of the subject measurement point.

Further, according to the embodiment, if a difference in maximum saturation between the projecting planes (projecting planes 64B and 64D, for example) is greater than or equal to a prescribed value, one or more projecting plane (projecting plane 64C, in this example) is added to divide the angular region between the two projecting planes 64. The data processor 10 performs this addition of the projecting plane 64 until the difference in the maximum saturation between two neighboring projecting plane 64 becomes lower than the prescribed value, as will be described later with referring to FIG. 11(b).

The HDD 14 shown in FIG. 5 is a hard disk drive and stores an ROB-to-RGB' table 141.

Figure 8A:
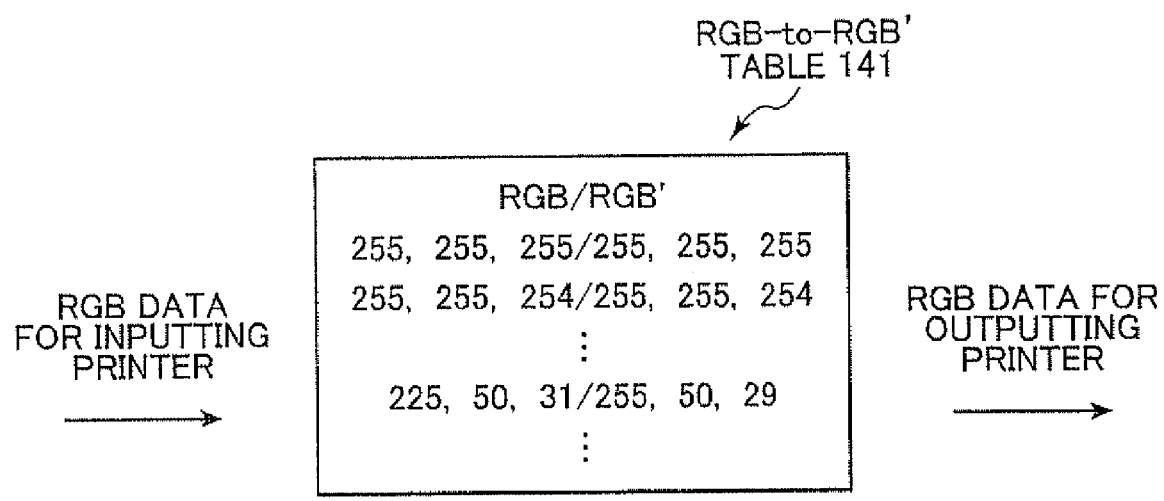
FIG. 8(a) conceptually illustrates a structure of an RGB-to-RGB' table.

The RGB-to-RGB' table 141 will be described with reference to FIG. 8(a) FIG. 8(a) conceptually illustrates the structure of the RGB-to-RGB' table 141. As shown in FIG. 8(a), the RGB-to-RGB' table 141 is for storing data indicating how to convert RGB data (RGB values), which is to be outputted to the inputting printer 30, to RGB' data (RGB' values), which is to be outputted to the outputting printer 50, in order to match colors on the inputting printer 30 and outputting printer 50.

The color data processor 10 according to the embodiment reads RGB data inputted into the inputting printer 30 via a network 20, converts this RGB data to RGB' data using the RGB-to-RGB' table 141, and outputs the RGB' is data to the outputting printer 50, thereby approximately matching the overall appearance of images formed on the inputting printer 30 based on RGB data with the overall appearance of images formed on the outputting printer 50 based on RGB' data. The RGB-to-RGB' table 141 is created using color gamut data for the inputting printer 30 and color gamut data for the outputting printer 50.

The input device 15 shown in FIG. 5 is used for inputting data and commands into the color data processor 10. The display device 16 displays text and images that aid the user in visually confirming data inputted into the color data processor 10 and the state of operations executed on the color data processor 10. The display device 16 is configured of a CRT display or a liquid crystal display, for example. The network interface (I/F) 18 connects the color data processor 10 to the network 20 and controls data inputted from or outputted to the inputting printer 30 or the outputting printer 50 via the network 20. As shown in FIG. 5, the CPU 11, the ROM 12, the RAM 13, the HDD 14, the input device 15, the display device 16, and the network interface 18 described above are interconnected via a bus line 19.

The inputting printer 30 is connected to the color data processor 10 described above via the network 20. The inputting printer 30 includes a CPU 31, a ROM 32, a RAM 33, an image-forming unit 34, and an interface 37 (I/F 37). The outputting printer 50 is also connected to the color data processor 10 via the network 20. The outputting printer 50 includes a CPU 51, a ROM 52, a RAM 53, an image-forming unit 54, and an interface 57 (I/F 57). The inputting printer 30 and outputting printer 50 are both configured of a printer well known in the art. Because, the CPU 31, the ROM 32, the RAM 33, the image-forming unit 34, and an interface 37 (I/F 37) correspond respectively to the CPU 51, the ROM 52, the RAM 53, the image-forming unit 54, and the interface 57 (I/F 57), only the structure of the inputting printer 30 will be described below.

The CPU 31 controls the operations of the inputting printer 30 by executing various programs. The ROM 32 stores programs for controlling operations of the inputting printer 30. The ROM 32 of the inputting printer 30 also stores an RGB-to-Lab table 321. Here, the ROM 52 of the outputting printer 50 stores an RGB-to-Lab table 521.

Figure 8B:
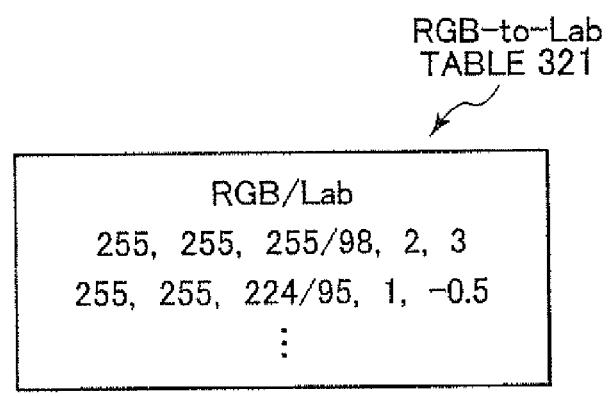
FIG. 8(b) conceptually illustrates a structure of an RGB-to-Lab table.

FIG. 8(b) conceptually illustrates the structure of the RGB-to-Lab table 321. As shown in FIG. 8(b), the RGB-to-Lab table 321 correlates RGB values, which are made from combinations of nine values for each of the RGB colors that are arranged at intervals of 32 (0, 32, 64, 96, 128, 160, 192, 224, and 255, for example) with L*a*b* values which are acquired by using a colorimeter to measure colors of patches that the printer 30 forms on a recording paper based on the RGB values. The L*a*b* values stored in the RGB-to-Lab table 321 can sufficiently cover the range of colors that can be rendered on the inputting printer 30 (i.e., the color gamut 68). The RGB-to-Lab table 321 is created and stored in the ROM 32 at the factory when manufacturing the inputting printer 30, for example. The structure of the RGB-to-Lab table 521 is the same as the structure of the RGB-to-Lab table 321. The RGB-to-Lab table 521 is created and stored in the ROM 52 at the factory when manufacturing the outputting printer 50, for example.

The color data processor 10 reads, as measurement points for the inputting printer 30, the L*a*b* values described in the RGB-to-Lab tables 321, and creates the color gamut of the inputting printer 30. The color data processor 10 reads, as measurement points for the outputting printer 50, the L*a*b* values described in the RGB-to-Lab tables 521, and creates the color gamut of the outputting printer 50. However, the invention is not limited to this configuration. For example, the color data processor 10 may be configured to acquire RGB-to-Lab tables provided by the printer vendors or the like through the Internet (not shown).

The image-forming unit 34 shown in FIG. 5 forms color images on the recording paper based on RGB data inputted via the network 20.

The interface 37 connects the inputting printer 30 to the network 20 and controls data inputted from and outputted to the color data processor 10 via the network 20.

As shown in FIG. 5, the CPU 31, ROM 32, RAM 33, image-forming unit 34, and interface 37 are interconnected via a bus line 39 (59 in the outputting printer 50).

Next, a color conversion table creating process executed on the color data processor 10 having the above construction will be described with reference to FIGS. 9 through 12. In this color conversion table creating process, the color data processor 10 creates color gamut data for each of the inputting printer 30 and outputting printer 50 and creates the RGB-to-RGB' table 141 (see FIG. 8(a)) based on this color gamut data.

Figure 9:
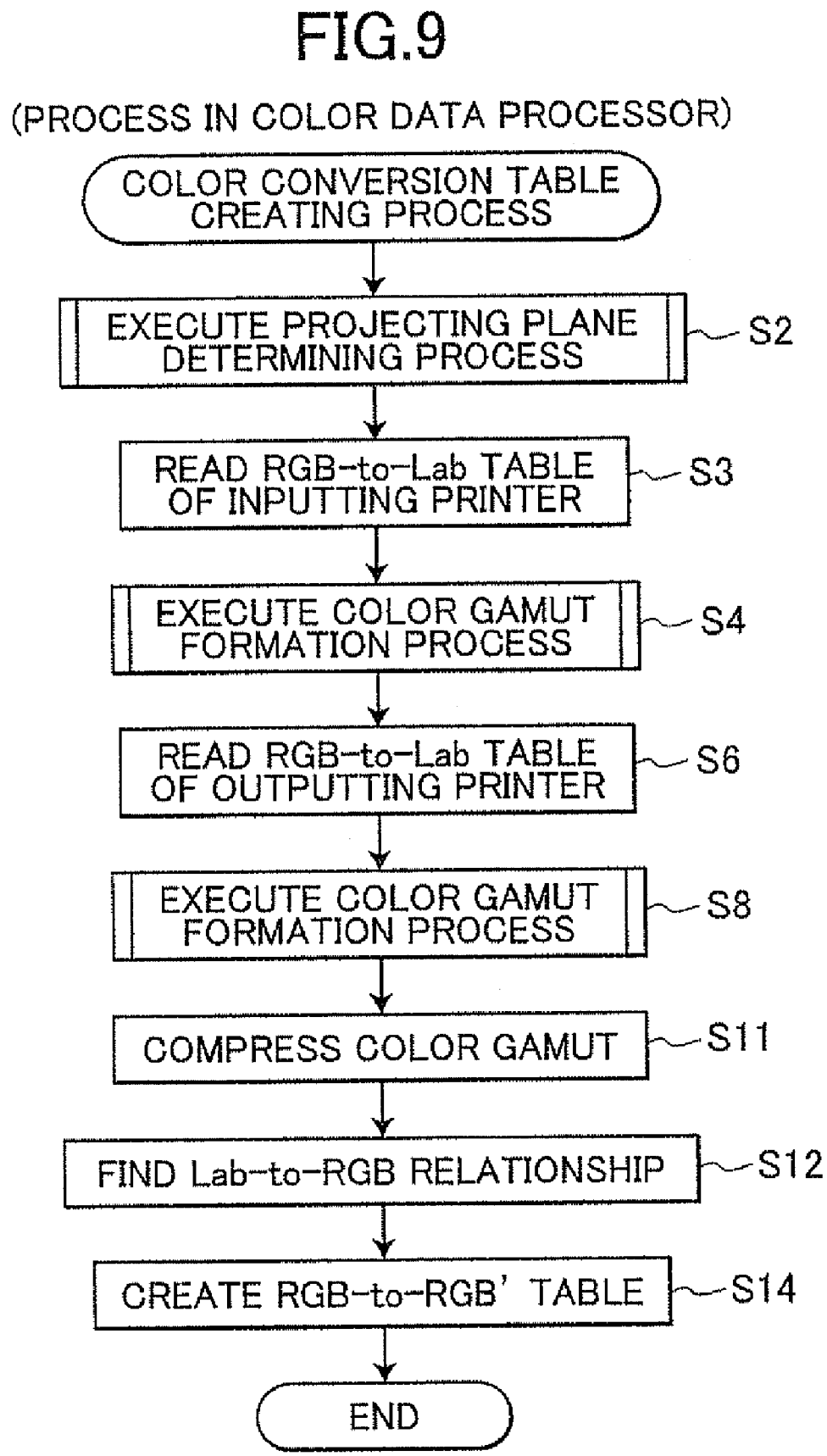
FIG. 9 is a flowchart illustrating steps in a color conversion table creating process.

FIG. 9 is a flowchart illustrating steps in the color conversion table creating process. In S2 at the beginning of the color conversion table creating process, the CPU 11 executes a projecting plane determining process described later with reference to FIGS. 10(a) and 10(b).

In S3 the CPU 11 reads the RGB-to-Lab table 321 from the inputting printer 30 (see FIG. 8(b)). In S4 the CPU 11 executes a color gamut formation process for creating color gamut data for the inputting printer 30 based on the measured values (L*a*b* values) stored in the RGB-to-Lab table 321 and stores the color gamut data in the input-end color gamut data memory area 133.

In S6 the CPU 11 reads the RGB-to-Lab table 521 from the outputting printer 50. In S8 the CPU 11 executes another color gamut formation process to create color gamut data for the outputting printer 50 based on the measured values (L*a*b* values) stored in the RGB-to-Lab table 521 and to store this color gamut data in the output-end color gamut data memory area 134 The color gamut formation processes of S4 and S8 will be described later with reference to FIG. 12.

In S11 the CPU 11 compresses the color gamut for the inputting printer 30. In this process, the CPU 11 compresses the color gamut for the inputting printer 30 in accordance with the color gamut of the outputting printer 50. More specifically, the CPU 11 converts the L*a*b* values in the RGB-to-Lab table 321 read in S3, in a compressing manner determined dependently on the color gamuts of the printers 30 and 50, so that all L*a*b* values read from the RGB-to-Lab table 321 will be included-in the color gamut 68 of the outputting printer 50.

In S12 the CPU 11 finds Lab-to-RGB relationship for the outputting printer 50. As described above, the ROM 52 of the outputting printer 50 stores the RGB-to-Lab table 521. Accordingly, the RGB-to-Lab table 521 is used to find the Lab-to-RGB relationship indicating the relationship of RGB values to L*a*b* values. In other words, the Lab-to-RGB relationship determines RGB values for a plurality of L*a*b* values that are arranged at uniform intervals, for example, in the L*a*b* space. Since the algorithm for finding this relationship is well known in the art, a detailed description of the process has been omitted.

In S14 the CPU 11 creates the RGB-to-RGB' table 141 (see FIG. 8(a)) using the RGB-to-Lab table 321 of the inputting printer 30 subjected to gamut compression in S11, and the Lab-to-RGB relationship for the outputting printer 50 found in S12, and ends the process. As described above, by performing gamut compression on the RGB-to-Lab table 321 for the inputting printer 30 in S11, all L*a*b* values now listed in the RGB-to Lab table 321 fall within the color gamut 68 of the outputting printer 50. Therefore, the CPU 11 can create the RGB-to-RGB' table 141 by combining the L*a*b* values in the RGB-to-Lab table 321 with L*a*b* values in the Lab-to-RGB relationship for the outputting printer 50 found in S12. This process for creating the RGB-to-RGB' table 141 is well known in the art and will not be described in detail herein.

The CPU 11 stores the RGB-to-RGB' table 141 created in the color conversion table creating process on the HDD 14 of the color data processor 10. The RGB-to-RGB' table 141 enables the color data processor 10 to match s colors in images formed on the inputting printer 30 and images formed on the outputting printer 50.

FIG. 10(a) is a flowchart illustrating steps in the projecting plane determining process S2. The projecting plane determining process is performed to determine hue angles φ of a plurality of projecting planes 64 to be used commonly when creating color gamut data for the inputting printer 30 (S4) and color gamut data for the outputting printer 50 (S8).

In the projecting plane determining process of S2, in S22 the CPU 11 performs a first hue angle determining process, in which hue angles φ of a plurality of vertices in a convex hull 62 (FIG. 7) are found and stored in the angle list 131, as hue angles of a plurality of projecting planes 64. Next, in S24 the CPU 11 performs a second hue angle determining process. In the second hue angle determining process, the CPU 11 examines projecting planes 64 at the hue angles φ that are now stored in the angle list 131. Then, if a difference in maximum saturation between some two neighboring projecting planes 64 at hue angles φ stored in the hue angle list 131, is larger than a prescribed value, the CPU 11 determines another projecting plane 64 that divides an angular space between the two neighboring projecting planes 64, then adds the hue angle φ of the determined projecting plane 64 to the angle list 131.

FIG. 10(b) is a flowchart illustrating steps in the first hue angle determining process of S22.

At the beginning of the first hue angle determining process of S22, in S221 the CPU 11 initializes the angle list 131. In S222 the CPU 11 stores a plurality of predetermined hue angles in the angle list 131. For example, the predetermined hue angles are hue angles that are arranged from 0° to 360° by 9° increments.

In S223 the CPU 11 reads the RGB-to-Lab table 321 for the inputting printer 30. In S224 the CPU 11 projects all the measurements points, which are positioned in the color space 65 at locations indicated by the measured values (L*a*b* values) stored in the RGB-to-Lab table 321, onto the a*b* plane and finds vertices 63 defining a convex hull 62 indicating the distributed saturation range of all the projected measurement points as shown in FIG. 7. The vertices 63 of the convex hull 62 can be found using an algorithm well known in the art, such as the gift wrapping algorithm.

In S225 the CPU 11 determines a hue angle for each of the vertices 63 of the convex hull 62 and adds these hue angles to the angle list 131. In S226 the CPU 11 reads the RGB-to-Lab table 521 of the outputting printer 50. In S227 the CPU 11 projects all the measurement points positioned in the L*a*b* color space 65 at locations indicated by the measured values (L*a*b* values) stored in the RGB-to-Lab table 521 onto the a*b* plane, and finds vertices 63 of another convex hull 62 indicating the distributed saturation range of the projected measurement points in a similar manner to S224. In S228 the CPU 11 determines a hue angle for each of the vertices 63 of the convex hull 62 and adds these hue angles to the angle list 131. That is, the CPU 11 adds, to the predetermined hue angles in the hue angle list 131, hue angles for both the vertices 63 of: a convex hull 62 that is determined based on the RGB-to-Lab table 321 of the inputting printer 30 (S225); and the vertices 63 of another convex hull 62 that is determined based on the RGB-to-Lab table 521 of the outputting printer 50 (S228).

In S229 the CPU 11 sorts the hue angles φ in the angle list 131 from the lowest value to the highest value. That is, the CPU 11 arranges hue angles φ in an ascending order. In 230 the CPU 11 adds a copy of the lowest hue angle φ among the sorted hue angles φ next to the highest hue angle. For example, in S229 the angle list 131 is sorted as (0°, 9°, 13°, 18°, 24°, ..., 342°, 347°, 350°, 351°). In S230 the CPU 11 adds a copy of the angle 0° to the end of the angle list 131. Accordingly, the angle list 131 is updated to (0°, 9°, 13°, 18°, 24°, ..., 342°, 347°, 350°, 351°, 0°).

In S231 the CPU 11 examines the difference between every two neighboring hue angles from the hue angles recorded in the angle list 131 and deletes one of the two hue angles from the list when the difference between the two hue angles is no greater than a prescribed value (4°, for example). In other words, when the difference between the two neighboring hue angles is lower than the prescribed value, the CPU 11 deletes one of the neighboring hue angles from the angle list 131. Subsequently, the CPU 11 proceeds to the second projecting angle determining process (S24).

In the first hue angle determining process (S22) described above, the color data processor 10 determines hue angles of vertices 63 of the convex hull 62. When the difference between the two hue angles is no greater than the prescribed value, the CPU 11 deletes one of the two hue angles from the angle list 131. Accordingly, the color data processor 10 can prevent the projecting planes 64 from being set too densely, then can reduce a processing time and memories to be used.

The hue angle φ is in a range from 0° to 360°. The largest angle in the angle list 131 is substantially near to the smallest angle in the angle list 131. In S230 the CPU 11 adds a copy of the initial angle φ among the sorted hue angles φ to the end of the angle list 131. So, in S231 the CPU 11 can easily examine the difference between the smallest hue angle and the largest hue angle in the angle list 131.

FIG. 11(a) is a flowchart illustrating steps in the second hue angle determining process of S24. In S2401 of the second hue angle determining process, the CPU 11 sets, as the target convex hull, the convex hull 62 with respect to the inputting printer 30 that is found in S224. In S2402 the CPU 11 performs a second hue angle adding process with respect to the inputting printer 30 that is described later in detail. In S2403 the CPU 11 sets, as the target convex hull, the convex hull 62 with respect to the outputting printer 30 that is found in S227. In S2404 the CPU 11 performs a second hue angle adding process with respect to the outputting printer 50 that is described later in detail.

Next, the second hue angle adding processes with respect to the inputting printer 30 (S2402) and the second hue angle adding process with respect to the outputting printer 50 are described in detail. The second hue angle adding process with respect to the outputting printer 50 (S2404) is the same with the second hue angle adding process with respect to the inputting printer 30 (S2402) except the following point. The second hue angle adding process with respect to the inputting printer 30 (S2402) employs the convex hull 62 with respect to the inputting printer 30 whereas the second hue angle adding process with respect to the outputting printer 50 (S2404) employs the convex hull 62 with respect to the outputting printer 50. So, the following description explains both of the second hue angle adding processes (S2402 and S2404) together.

In the second hue angle determining process, the CPU 11 calculates a difference in maximum saturation between one projecting plane 64 and another projecting plane 64 neighboring the projecting plane 64 among the projecting planes 64 whose hue angles are stored in the hue angle list 131. The maximum saturation at each projecting plane 64 is defined as a distance of a target convex hull 62 at the hue angle of the subject projecting plane 64. If this difference is larger than the prescribed value, the CPU 11 adds a new hue angle φ between the hue angles φ of the two projecting planes 64.

More specifically, as shown in FIG. 11(b), in S242 the CPU 11 sets a reference pointer at an initial address of the angle list 131, and reads a hue angle φ corresponding to the address indicated by the pointer, that is, the lowest hue angle among the hue angles φ in the angle list 131. The CPU 11 then moves the reference pointer to the next address. In S244 the CPU 11 calculates a maximum saturation of the projecting plane 64 having the hue angle φ read in S242. The maximum saturation is calculated as a distance from the point of origin to the surface (boundary) of the target convex hull 62 at the hue angle φ.

In S246 the CPU 11 determines whether all the hue angles φ in the angle list 131 have been processed. If there is a hue angle φ that has not yet been processed (S246, No), in S248 the CPU 11 reads the unprocessed hue angle φ corresponding to the address presently indicated by the pointer.

In S250 the CPU 11 calculates a maximum saturation on the projecting plane 64 at the hue angle φ read in S248. In S252 the CPU 11 calculates a difference S (hereinafter, referred to as saturation difference) between the maximum saturation calculated in the current step S250 and the maximum saturation that is calculated just before the current step S250. That is, the CPU 11 calculates the saturation difference between the projecting plane 64 at the present hue angle φ and another projecting plane 64 whose hue angle is listed adjacent to and smaller than the present hue angel φ. The projecting plane 64 and the another projecting plane 64 will be referred to as "presently-being processed neighboring two projecting planes 64". That is, in first routine of S248-S260, the CPU 11 calculates in S252 the difference between the maximum saturations calculated in S244 and S250. In the second and successive routines of S248-S260, the CPU 11 calculates the difference between the maximum saturation that is calculated in S250 of the present routine of S248-S260 and the maximum saturation that has been calculated in S250 of the latest routine of S248-S260.

In S254 the CPU 11 determines whether the saturation difference is larger than a prescribed value. In the embodiment, the prescribed value used in S254 is set to "1.2". However, the prescribed value may be other values, depending on a required accuracy. If the CPU 11 determines that the saturation difference is smaller than or equal to the prescribed value (S254: No), in S262 the CPU 11 moves the reference pointer to the next address. Then, the CPU 11 returns to 3246 and repeats the steps S248-254.

On the other hand, if the CPU 11 determines that the saturation difference is larger than the prescribed value (Yes in S254), the CPU 11 determines a divisional number between the neighboring two projecting planes 64.

Specifically, the divisional number is determined by the following equation (1).

$$(\text{divisional number})=(\text{saturation difference})/(\text{prescribed value}) \quad (1)$$

Here, the prescribed value in the equation (1) is the same value with the prescribed value (1.2 in the embodiment) used in the determination of S254. Accordingly, the larger the saturation difference between the neighboring projecting planes 64 becomes, the larger the divisional number is determined. That is, in such a hue region where the saturation difference changes rapidly, projecting planes 64 will be densely set. If the saturation difference is aliquant by the prescribed value, the CPU 11 preferably rounds up the calculated result of the equation (1) to the whole number.

In S258 the CPU 11 determines hue angle(s) $\phi$ of one or more projecting plane 64 that equiangularly divides an angular region between the presently-being processed neighboring two projecting planes 64 (projecting plane 64 having the hue angle currently read in S248 and projecting plane 64 having the hue angle read latest) based on the divisional number determined in S256. The number of the determined hue angle(s) is equal to the divisional number. Subsequently, the CPU 11 adds the determined hue angle(s) $\phi$ to the angle list 131. As described above, the hue angles $\phi$ are sorted in the angle list 131 in an ascending order in S229. So, the determined hue angle(s) $\phi$ is inserted to the angle list 131 at a location that allows all the hue angles including the newly-inserted hue angle to be arranged in the ascending order. In S260 the CPU 11 moves the reference pointer to the smallest hue angle $\phi$ among the hue angle(s) $\phi$ that has been just added in the angle list 131. Subsequently, the CPU 11 returns to S248.

The CPU 11 repeats the steps S248-260. That is, in S248 the CPU 11 reads the smallest hue angle $\phi$ among the one or more hue angle that have been added in S258 in the last routine of S244-S260. In S250 the CPU 11 calculates a saturation difference between maximum saturation on a projecting plane 64 having the currently-read hue angle $\phi$ and a neighboring projecting plane 64 whose hue angle is stored in the hue angle list 131 at a location immediately prior to the currently-read hue angle $\phi$. In S254 the CPU 11 determines whether this saturation difference is larger than the prescribed value. If this saturation difference is larger than the prescribed value (S254: Yes), the CPU 11 further determines hue angle(s) of one or more projecting planes that divide space between the presently-being processed neighboring two projecting planes 64.

After the CPU 11 processes all the hue angles $\phi$ stored in the angle list 131 (S246: Yes) by repeating steps S248-S260, the CPU 11 ends the second hue angle adding process (S2402 or S2404).

As described above, the hue angles $\phi$ stored in the angle list 131 are sorted from the lowest value to the highest value (S229) and a copy of the smallest hue angle $\phi$ is added to the end (S230). Saturation differences can be examined over the whole range of the hue angles $\phi$.

In the projecting plane determining process of S2, the projecting planes 64 are determined such that a difference between a maximum saturation of each projecting plane 64 and a maximum saturation of another projecting plane 64 neighboring the subject projecting plane 64 will be smaller than or equal to the prescribed value.

Since the above configuration can prevent the projecting planes 64 from being set excessively densely, the projecting planes 64 are determined in order to create an accurate color gamut while reducing the processing time and the memory.

Since the hue angles $\phi$ of additional projecting planes 64 are determined based on the divisional number obtained by the saturation difference between two neighboring projecting planes 64, an appropriate number of projecting planes 64 can be easily added based on the saturation difference.

Figure 12:
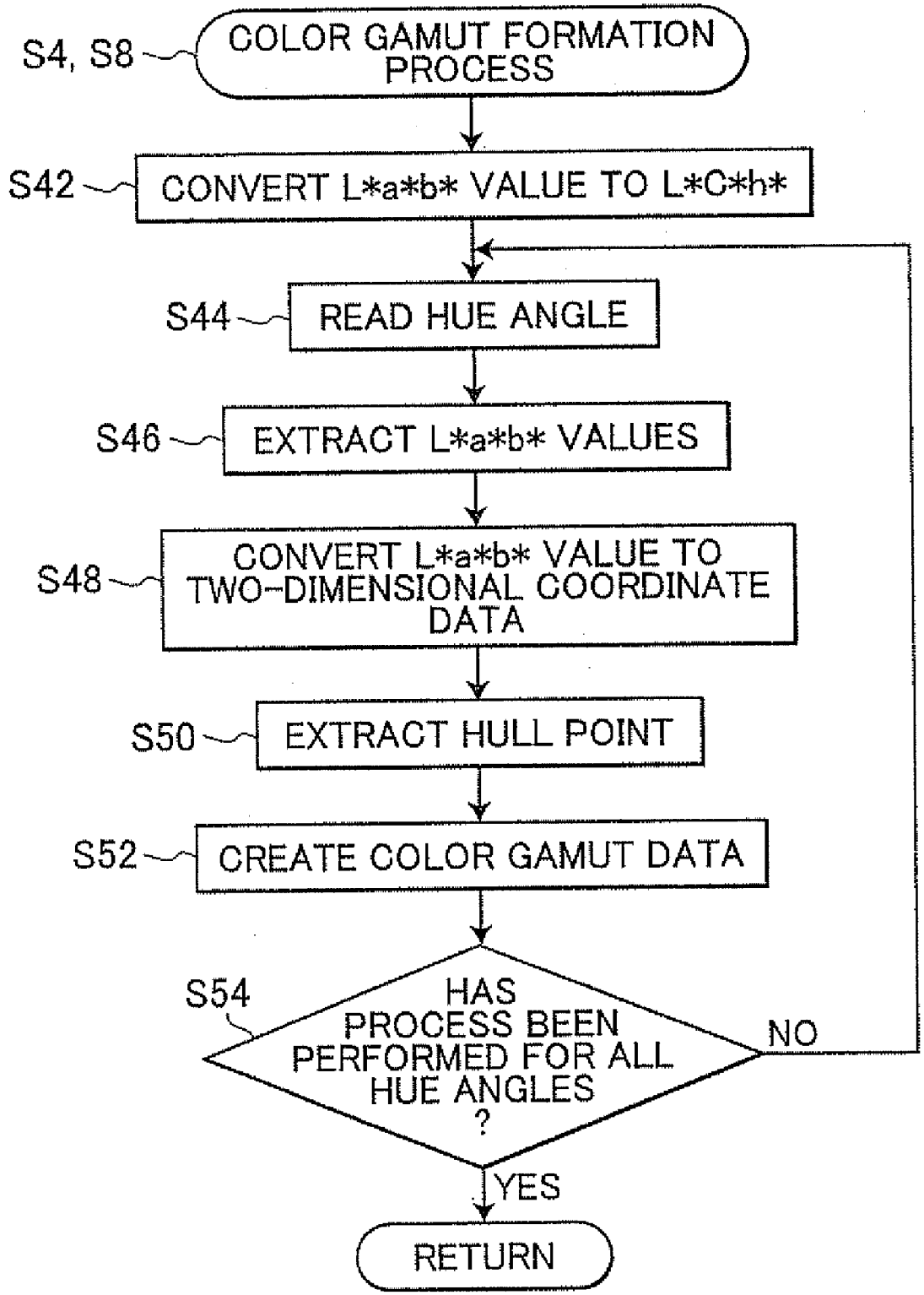
FIG. 12 is a flowchart illustrating steps in a color gamut formation process.

Next, the color gamut formation processes of S4 and S8 executed by the color data processor 10 will be described with reference to FIG. 12. The following description explains both of color gamut formation processes of S4 and S8 together except specifying differences therebetween. FIG. 12 is a flowchart illustrating steps in the color gamut formation processes (S4 and S8). The color gamut formation process of S4 is executed after the CPU 11 reads the RGB-to-Lab table 321 from the inputting printer 30. The color gamut formation process of S4 is performed to create color gamut data for the inputting printer 30. The color gamut formation process of S8 is executed after the CPU 11 reads the RGB-to-Lab table 521 from the outputting printer 50. The color gamut formation process of S8 is performed to create color gamut data for the outputting printer 50.

In S42 of the color gamut formation process, the CPU 11 converts, to L*C*h* values, all the measured values (L*a*b* values) included in the RGB-to-Lab table 321 (when the color gamut formation process is executed in S4) or the RGB-to-Lab table 521 (when the color gamut formation process is executed in S8) read in the previous step. Here, C* represents hue, and h* represents hue angle.

In S44 the CPU 11 reads a single hue angle $\phi$ from the plurality of hue angles $\phi$ recorded in the angle list 131. In S46 the CPU 11 extracts measurement points that are located neighboring the projecting plane 64 having the hue angle $\phi$ (present hue angle $\phi$) read in S44. That is, the CPU 11 finds, in the angle list 131, a previous hue angle $\phi_{pre}$ that is located adjacent to and smaller than the present hue angle $\phi$ read in S44. The CPU 11 determines one divisional plane that has a hue angle $(\phi+\phi_{pre})/2$. In other words the divisional plane equiangularly divides the space between the projecting plane 64 at the present hue angle $\phi$ and another projecting plane 64 at the previous hue angle $\phi_{pre}$. Further, the CPU 11 finds, in the angle list 131, a subsequent hue angle $\phi_{sub}$ that is located adjacent to and larger than the present hue angle $\phi$ read in S44. The CPU 11 determines another divisional plane that has a hue angle $(\phi+\phi_{sub})/2$. In other words this another divisional plane equiangularly divides the space between the projecting plane 64 at the present hue angle $\phi$ and another projecting plane 64 at the subsequent hue angle $\phi_{sub}$. The CPU 11 extracts the L*C*h* values of the measurement points that are located in the space between the two divisional planes. In other words, the CPU 11 extracts the L*C*h* values of the measurement points whose hue angles 4 are between the previous hue angle $(\phi+\phi_{pre})/2$ and the subsequent hue angle $(\phi+\phi_{sub})/2$. The CPU 11 converts the extracted L*C*h* values back to L*a*b* values. More specifically, the CPU 11 projects all the measurement points with hue angles in the range from $(\phi+\phi_{pre})/2$ to $(\phi+\phi_{sub})/2$ onto the projecting plane 64 having the hue angle $\phi$ as shown in FIG. 6(a) The CPU 11 projects each of these measurement points on the projecting plane 64 at such a location that a line connecting the measurement point and the location, at which the measurement point is projected, is normal to the projecting plane. The CPU 11 calculates, on the projecting plane 64, two-dimensional XY coordinate data indicative of the location on which the measurement point is projected. The CPU 11 sets the calculated result as the two-dimensional coordinate data of the projected measurement point.

In S48 the CPU 11 converts the extracted L*a*b* values to two-dimensional coordinate data expressed in a Cartesian coordinate system (XY-coordinate system) as shown in FIGS. 6(a). This two-dimensional coordinate data indicates positions of the measurement points with hue angles in the range from $(\phi+\phi_{pre})/2$ to $(\phi+\phi_{sub})/2$ that are projected on the projecting plane 64 having the hue angle $\phi$ read in S44. More specifically, the CPU 11 projects all the measurement points with hue angles in the range from $(\phi+\phi_{pre})/2$ to $(\phi+\phi_{sub})/2$ onto the projecting plane 64 having the hue angle $\phi$ as shown in FIG. 6(a). The CPU 11 projects each of these measurement points on the projecting plane 64 at such a location that a line connecting the measurement point and the location, at which the measurement point is projected, is normal to the projecting plane. The CPU 11 calculates, on the projecting plane 64, two-dimensional XY coordinate data indicative of the location on which the measurement point is projected. The CPU 11 sets the calculated result as the two-dimensional coordinate data of the projected measurement point.

In 550 the CPU 11 extracts hull points 67 of a convex hull 68 encompassing all the measurement points on the projecting plane 64 (see FIG. 6(b)). The hull points 67 are extracted using an algorithm well known in the art, such as the gift wrapping algorithm.

In S52, as shown in FIG. 6(c) the CPU 11 creates color gamut data configured of polar coordinate data (r data, θ data) representing the surface of the color gamut 68 based on the coordinate data of the hull points 67 extracted in S50, and stores this color gamut data in the input-end color gamut data memory area 133 (when the color gamut formation process is executed in S4) or the output-end color gamut data memory area 134 (when the color gamut formation process is executed in S8). In S54 the CPU 11 determines whether the above process has been performed for all hue angles φ recorded in the angle list 131. The CPU 11 repeats the above process from S44 if unprocessed hue angles φ remain (S54: NO).

If the CPU 11 determines, after repeatedly performing the above process, that the process has been performed for all hue angles φ recorded in the angle list 131 (S54: YES), the CPU 11 ends the color gamut formation process.

Through the color gamut formation process described above, the CPU 11 can create color gamut data for the inputting printer 30 and the outputting printer 50 based on the RGB-to-Lab tables 321 or 521 read just prior to the process.

While the invention has been described in detail with reference to the above embodiment thereof, it would be apparent to those skilled in the art that various changes and modifications may be made therein without departing from the spirit of the invention.

First Modification

In the first hue angle determining process of S22 described above, the color data processor 10 finds vertices 63 of the convex hull 62 that encompasses all the projected measurement points and that indicates the distribution range of the saturations, and adds hue angles of the vertices 63 in the angle list 131 (in S224 and S230). However, rather than finding vertices of the convex hull 62, the color data processor 10 may be configured to find vertices of a concave polygon 70 or other polygon that encompasses all the projected measurement points, and to add hue angles of the vertices to the angle list 131. In other words, the color data processor 10 adds hue angles at vertices that form convex portions.

Figure 13:
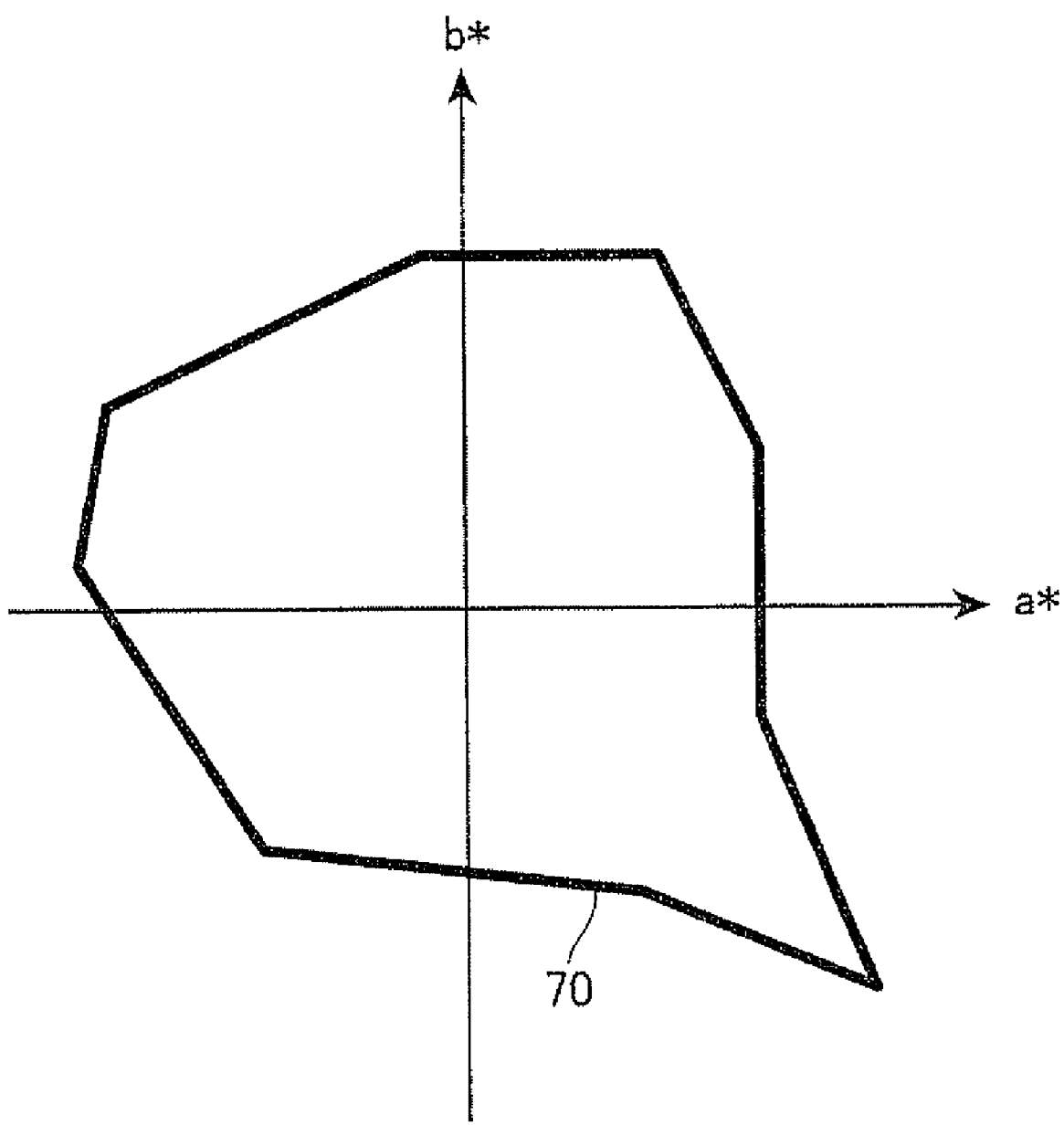
FIG. 13 shows an example of a concave polygon that is created to encompass measurement points projected onto the a*b* plane in the color space according to a first modification of the embodiment.

FIG. 13 shows an example of a concave polygon 70 that encompasses all the measurement points projected onto the a*b* plane in the color space 65. Here, the concave polygon 70 is a polygon that does not meet the condition of all interior angles being less than 180° By forming a projecting plane 64 at a hue angle passing through each vertex of the concave polygon 70, the color data processor 10 can create more precise color gamut data.

Figure 14:
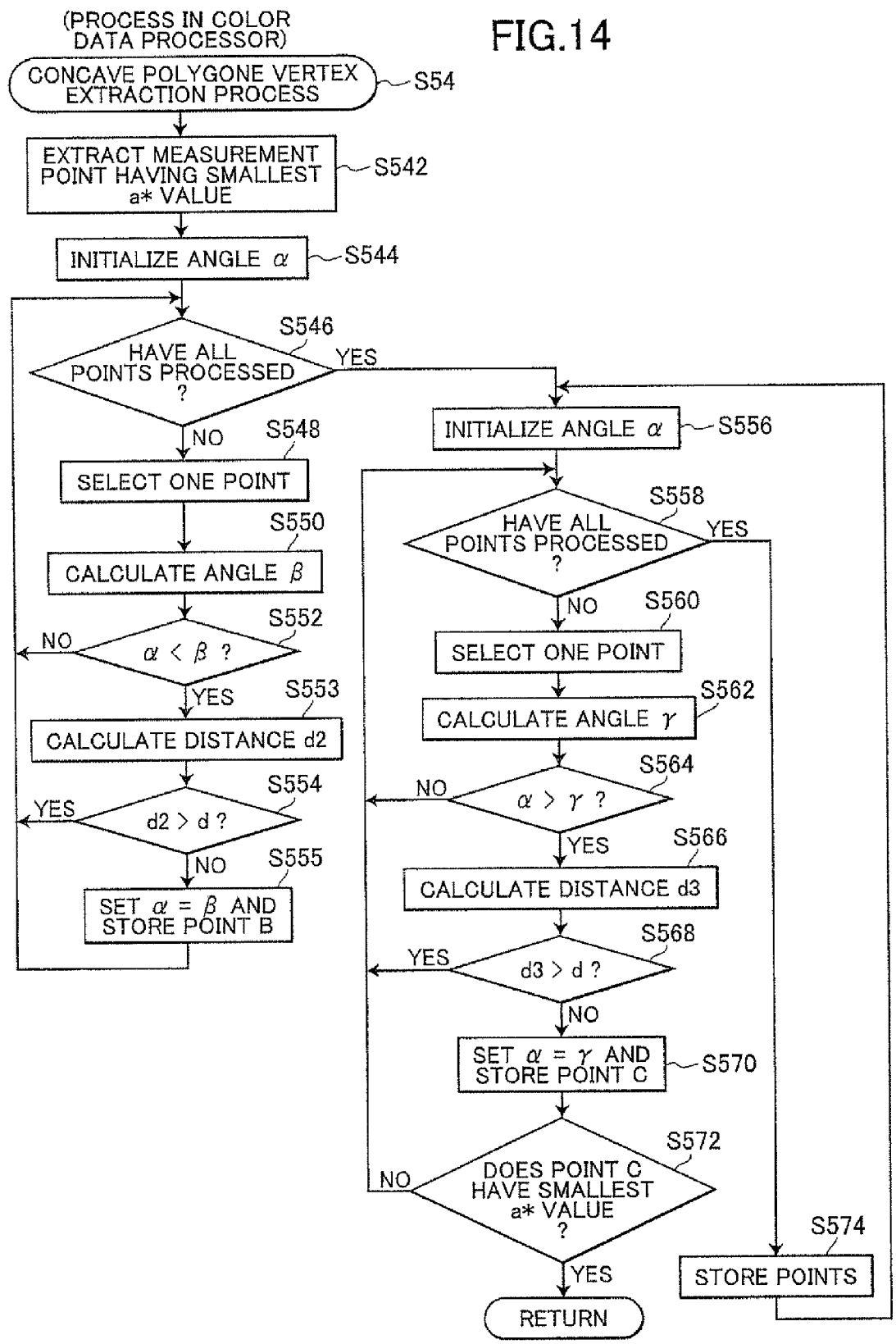
FIG. 14 is a flowchart illustrating steps in a concave polygon vertex extraction process for extracting vertices of the concave polygon according to the first modification of the embodiment.

FIG. 14 is a flowchart illustrating steps in a concave polygon vertex extraction process for extracting vertices of the concave polygon 70. By executing this concave polygon vertex extraction process of S54 in place of the process for finding vertices of a convex hull in S225 or S228 of the first hue angle determining process (see FIG. 10(b)), the color data processor 10 can determine the projecting planes 64 based on vertices of the concave polygon 70 shown in FIG. 13.

Figure 15A:
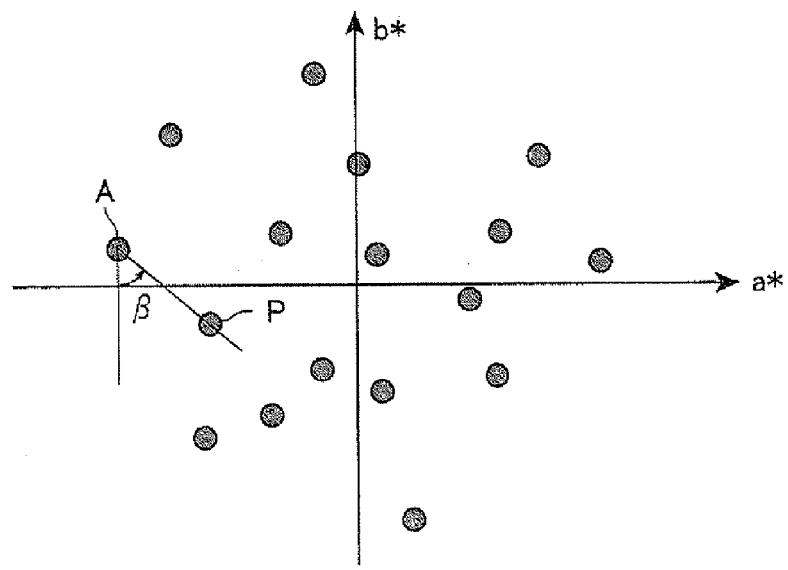
FIG. 15(a) is a graph illustrating an angle β.

In S542 the CPU 11 extracts a measurement point projected on the a*b* plane having the smallest a* value and stores this measurement point in the RAM 13 as a point A as shown in FIG. 15(a). Here, each measurement point is a L*a*b value stored in the RGB-to-Lab table 321 when the process S54 are performed in place of the finding vertices of the convex hull in S225. Each measurement point is a L*a*b* value stored in the RGB-to-Lab table 521 when the process S54 is performed in place of the finding vertices of the convex hull in S228. In S544 the CPU 11 initializes an angle α to 0.

In S546 the CPU 11 determines whether all measurement points other than the point A have been processed. Since the CPU 11 initially reaches a negative determination (S546. NO), in S548 the CPU 11 selects one measurement point other than the point A and reads coordinate data of the measurement point. In S550 the CPU 11 calculates an angle β indicating the positional relationship between the selected measurement point and the point A, based on the point A and the coordinate data read in S548.

FIG. 15(a) is a graph illustrating this angle β. As shown in FIG. 15(a), in the concave polygon vertex extraction process, the CPU 11 defines the angle β as an angle formed between a line connecting the selected point (a point P in FIG. 15(a)) and the point A and a line extending from the point A along the negative direction of the b*-axis. That is, the angle β is defined as a counterclockwise angle from the line extending in the negative direction of the b*-axis set to 0°.

Returning to FIG. 14, in S552 the CPU 11 determines whether the angle β calculated in S550 is greater than the angle α. Since the angle α is initialized to 0° in the beginning, the CPU 11 determines that β is greater than α (S552: YES). In S553 the CPU 11 calculates a distance d2 from the point A to the selected measurement point. In S554 the CPU 11 determines whether the distance d2 calculated above is greater than a reference distance d. Here, the reference distance d is stored in advance. That is, the reference distance d is previously set to such a value that is smaller than distances between the vertices of the convex hull 62 as shown in FIG. 7. If the calculated distance d2 is greater than the reference distance d (S554: YES), indicating that the selected point is too apart from the point A, the CPU 11 determines that this point should not be a vertex of the concave polygon 70 and returns to S546.

However, if the calculated distance d2 is less than the reference distance d (S554: NO), indicating that the point selected in S548 is sufficiently near the point A and, that this selected point has a possibility to be a vertex of the concave polygon adjacent to the point A, in S555 the CPU 11 sets a to the value of β (α=β) and stores the measurement point selected in S548 in the RAM 13 as a point B. Subsequently, the CPU 11 returns to S546. In S548 the CPU 11 selects a next measurement point, reads coordinate data of this point, and repeats the process described above. By repeatedly performing this process, the CPU 11 can determine a measurement point having the maximum angle β as a point B among all the projected measurement points that are within distance d from the point A on the a*b* plane.

Figure 15B:
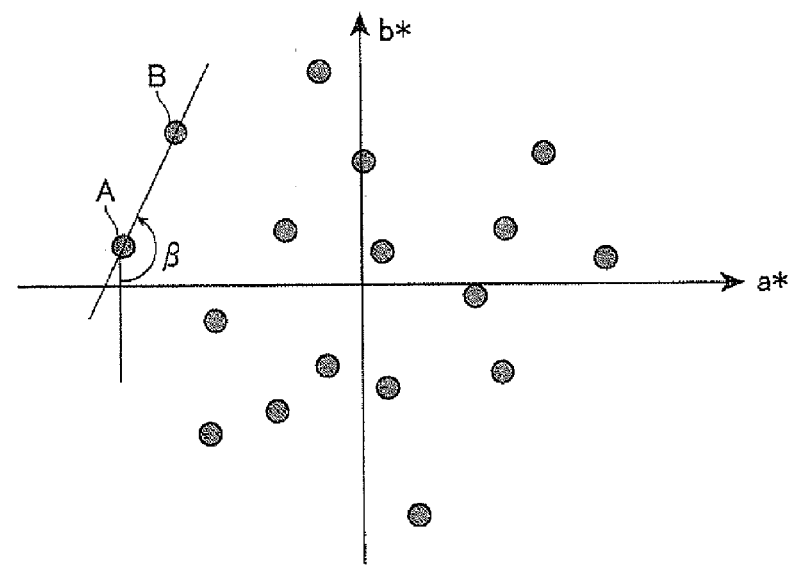
FIG. 15(b) shows a positional relationship of points A and B.
Figure 15C:
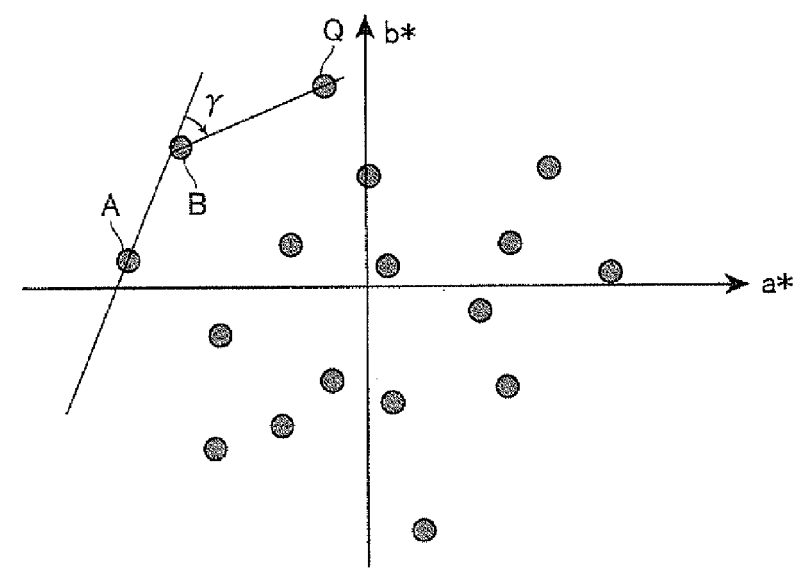
FIG. 15(c) shows a positional relationship between the points A and B and a newly selected measurement point P.

FIG. 15(*b*) shows the positional relationship of the points A and B. As shown in FIG. 15(*b*), a point B can be extracted as a vertex of the concave polygon 70 adjacent to the point A by setting the point B to the measurement point having the largest angle β among all the projected points that are located on the a*b* plane within the distance d from the point A. Here, the specific method of performing calculations to extract the point B is not limited to the method described above in S546-S555, provided that the point B can be found such that all the points within the distance d from the point A other than the points A and B are positioned on one side of a line passing through the points A and B.

Returning to FIG. 14, when this process for determining the point B has been performed for all measurement points other than the point A (S546: YES), in S556 the CPU 11 initializes the angle α to 360°. In S558 the CPU 11 determines whether all the measurement points other than the points A and B have been processed in S558-S572. Since the CPU 11 reaches a negative determination initially (SS58: NO), in S560 the CPU 11 selects one measurement point Q other than the points A and B and reads coordinate data for this measurement point Q. In S562 the CPU 11 calculates an angle γ formed between a line connecting the selected measurement point Q and the point B and a line connecting the points A and B.

FIG. 15(*c*) shows the positional relationship between the points A and B and the newly selected measurement point. (point Q in FIG. 15(*c*)). As shown in FIG. 15(*c*), the angle γ is a clockwise angle (rightward) from the line connecting the points A and B to the line connecting the selected measurement point Q and the point B.

Returning to FIG. 14, in S564 the CPU 11 determines whether the calculated angle γ is smaller than the angle α. Since the angle a is set initially to 360°, the CPU 11 determines that γ is smaller than α (S564: YES).

In S566 the CPU 11 calculates a distance d3 from the point B to the measurement point Q selected in S560. In S568 the CPU 11 determines whether the calculated distance d3 is greater than the reference distance d. If the distance d3 is greater than the reference distance d (S568: YES), indicating that the selected point Q is too far from the point A, then the CPU 11 determines that the selected point Q should not be a vertex of the concave polygon adjacent to the point B and returns to S558.

However, if the calculated distance d3 is within the reference distance d (S568: NO), indicating that the selected point Q is sufficiently near the point B and, that the selected point Q has a possibility to be a vertex adjacent to the point B, in S570 the CPU 11 sets a to the value of γ (α=γ) and stores the measurement point extracted in S560 in the EM 13 as a point C. In S572 the CPU 11 determines whether the point C has a minimum a* value among all the measurement points on the a*b* plane. Since the CPU 11 reaches a negative determination when not all vertices have been extracted (S572: NO), the CPU 11 returns to S558 and repeats the process described above. By repeating the process of S558-S572 described above, the CPU 11 can set a point C to the measurement point that has the smallest angle γ among the projected measurement points other than the points A and B on the a*b* plane and that is separated from the point B by a distance no greater than the reference distance d.

After performing the above process on all measurement points (S558: YES), in S574 the CPU 11 sets the point B (the coordinate value of the current point B) as a new point A, sets the point C (the coordinate value of the current point C) as a new point B. Further in S574 the CPU 11 stores coordinate data of these points in the RAM 13. Data of vertices extracted as points A, B, and C are stored in the RAM 13 in association with the order in which they have been extracted. Next, the CPU 11 returns to S556 and repeats the process described above i.e., a process for extracting the next point C by using the previously extracted point C as a new point B.

When the CPU 11 determines that the point C has a minimum a* value among all the measurement points on the a*b* plane after repeatedly performing the above process (S572: YES), then the CPU 11 ends the concave polygon vertex extraction process.

In the concave polygon vertex extraction process of S54, the color data processor 10 can extract vertices of a concave polygon shown in FIG. 13. Hence, the color data processor 10 can set the projecting planes 64 based on the hue angles passing through the vertices of the concave polygon 70.

Second Modification

Figure 16:
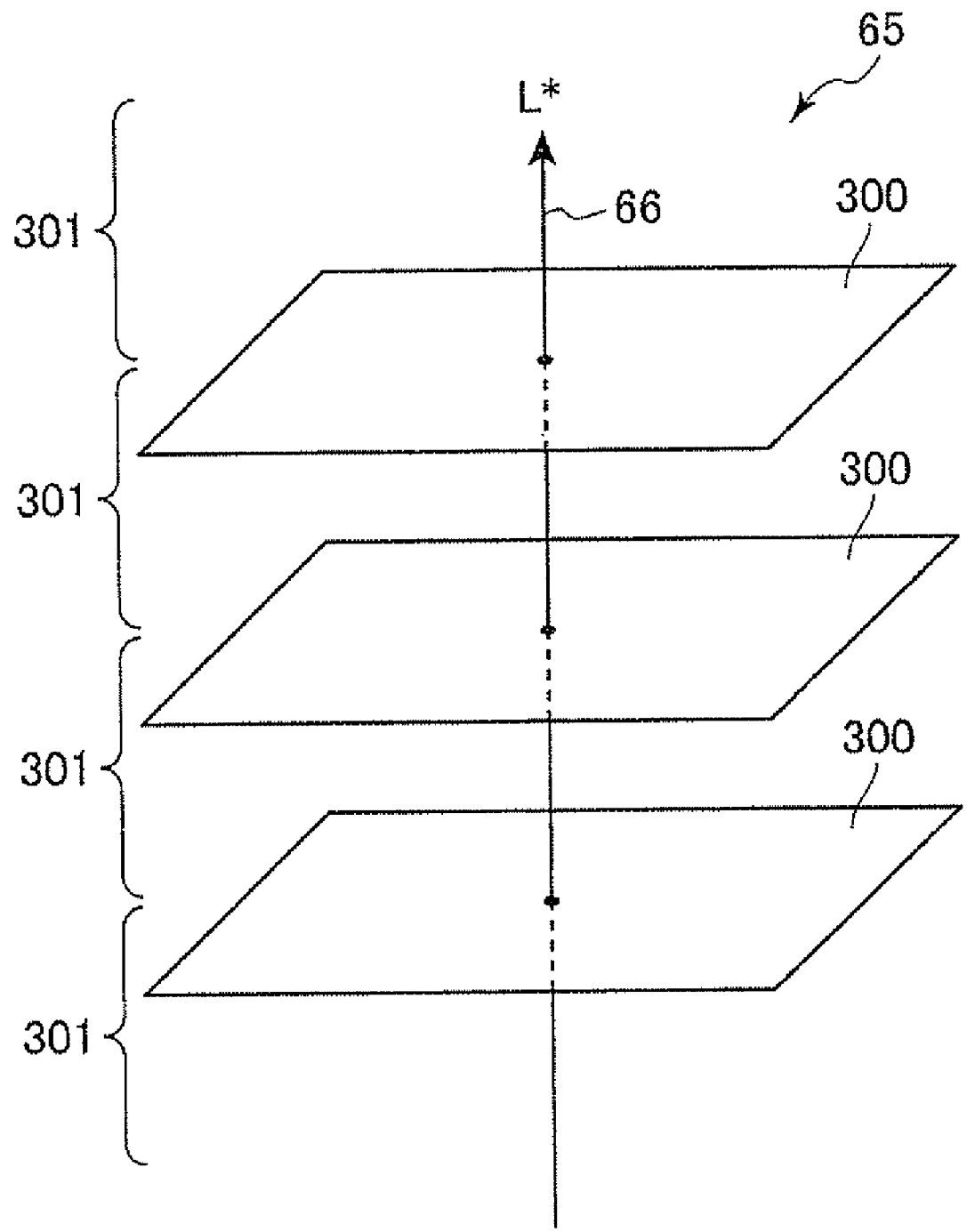
FIG. 16 is an explanatory diagram illustrating a plurality of lightness regions according to a second modification.

While the color data processor 10 projects all the measurement points in the color space 65 onto the single a*b* plane having L* of 50 in the projecting plane determining process of S2 described above, as shown in FIG. 16 the color data processor 10 may instead be configured to divide the color space 65 into a plurality of lightness regions 301 by a plurality of planes 300 orthogonal to the achromatic axis 66, and to project all the measurement points located within one of the plurality of lightness regions 301 onto the a*b* plane. The color data processor 10 determines vertices of a polygon generated based on the distributed range of measurement points projected on the a*b* plane. By repeatedly performing the above procedures, the color data processor 10 determines vertices of a plurality of polygons for all the plurality of lightness regions. In other words, the color data processor 10 determines vertices of a polygon for each lightness region and adds hue angles passing through vertices of each polygon to the angle list 131. So the angle list 131 has hue angles for all the lightness regions.

Accordingly, even when measurement points are irregularly distributed for each lightness, the color data processor 10 can determine hue angles for projecting planes 64 reflecting this irregular distribution and can create color gamut data accurately representing the color gamut of the device.

Third Modification of Embodiment

If it is desirable to create more precise color is gamut data for a certain hue region (blue region, for example) than for other hue regions, the color data processor 10 may change the prescribed value that is used as a threshold to examine the saturation difference in S254 of the second hue angle adding process so that the projecting planes 64 are set more densely for this hue region.

Fourth Modification

In the first hue angle determining process of S22 according to the embodiment, the color data processor 10 determines hue angles φ of the projecting planes 64 based on the vertices of the polygon (convex hull 62). However, the color data processor 10 may simply determine hue angles φ of the projecting planes 64 at regular intervals. Since this process is simple, the processing time is reduced.

Fifth Modification

In the first hue angle determining process of S22, hue angles corresponding to twenty or forty evenly spaced hues in the Munsell color system may be pre-stored in the angle list 131 In this case, the color data processor 10 can create color gamut hue data for projecting plane 64 that are arranged at intervals corresponding to color differences perceivable by the human eye. To this angle list 131, the CPU 11 adds hue angles in S225 and S228 of the first hue angle determining process and in S258 of the second hue angle adding processes Sixth Modification In the color gamut formation process (S4 and S8), the color gamuts for the inputting printer 30 and the outputting printer 50 are created by using the angle list 131 commonly. Different two angle lists 131 may be used in the color gamut formation processes for the inputting printer 30 and the outputting printer 50. That is, one angle list 131 that is used in the color gamut formation process (S4) of the inputting printer 30 is different from another angle list 131 that is used in the color gamut formation process (S8) of the outputting printer 50

Seventh Modification

In the embodiment, the color gamut is created based on the color space 65 represented by the L*a*b* color coordinate system. However, the color space 65 may be represented by other color coordinate system, such as the L*C*h* color coordinate system.

Eighth Modification

In the embodiment, each projecting plane 64 includes the achromatic axis 66. However, the projecting plane 64 may include one reference line that is other than the achromatic axis and that is defined in the color space 65.

In this case, the color space 65 may be expressed by a cylindrical coordinate system whose axis is set to the reference line. The cylindrical coordinate system defines a radius that is a distance from the reference line. In the projecting plane determining process of S2, the color data processor 10 finds, for each of the printers 30 and 50, a distribution of radius indicative of a distribution range of radii of the measurement points projected. Projecting plane 64 are defined to include the reference line. The distribution of radius defines a maximum radius that is reproducible by a corresponding printer at a location of each projecting plane 64. The color data processor 10 calculates a difference between two maximum radii at two projecting planes 64 neighboring each other. The color data processor 10 adds a new projecting plane 64 to allow the difference between two maximum radii of two projecting planes neighboring each other to be smaller than a prescribed value.

Ninth Modification

In the first angle determining process S22, in S222 the predetermined hue angles are stored in the angle list 131. Subsequently, in S225 and in S228 the hue angles of the vertices 63 are added in the angle list 131. However, in the first angle determining process S22, only the predetermined hue angles may be stored in the angle list 131 without adding the hue angles of the vertices 63 thereto. Alternatively, in the first angle determining process S22, each hue angle of the vertices 63 may be stored without storing the predetermined hue angles.

In the above-described embodiment, the color data processor 10 creates color gamuts for the printers 30 and 50 in order to make color matching between the printers 30 and 50. However, the color data processor 10 may create color gamuts for any types of image forming devices in order to make color matching between the image forming devices. Examples of the image forming device includes a display device. The color data processor 10 may matche the color gamuts for different types of image forming devices.

The color data processor 10 may be provided inside the printers 30 or 50. The color data processor 10 may be provided inside any type of image forming device.

What is claimed is:

1. A color gamut data creating device comprising:
   a receiving unit configured to receive measurement points concerning an image forming device, the measurement points being defined in a color space, the color space having an achromatic axis and an axis perpendicular to the achromatic axis, the color space representing hue by a hue angle defined from the axis perpendicular to the achromatic axis, representing lightness along the achromatic axis, and representing saturation by a distance from the achromatic axis;
   a target plane determining unit configured to determine a saturation distribution based on the measurement points, the saturation distribution defining a maximum saturation reproducible by the image forming device at each of a plurality of hue angles, the target plane determining unit further configured to determine a plurality of target planes, each target plane having a fixed hue angle and including the chromatic axis, a distribution of the plurality of target planes being varied to maintain a difference between a maximum saturation at a hue angle of each target plane and a maximum saturation at a hue angle of another target plane that is adjacent to the each target plane below a prescribed value;
   a locating unit configured to project, on each target plane, those measurement points that are within a prescribed range relative to the subject target plane; and
   a color gamut creating unit configured to create color gamut data indicative of a distribution range of the measurement points projected on each target plane.

2. The color gamut data creating device according to claim 1, wherein the target plane determining unit comprises:
   a plane setting unit configured to set at least two target planes;
   a difference calculating unit configured to calculate a difference between a maximum saturation at a hue angle of one target plane and a maximum saturation at a hue angle of another target plane that is adjacent to the each target plane; and a plane adding unit configured to add, to the at least two target planes, a target plane whose hue angle has a value between values of hue angles of the one target plane and the another target plane if the calculated difference is larger than the prescribed value.

3. The color gamut data creating device according to claim 2, wherein the plane setting unit sets the at least two target planes to have their hue angles shifted from one another at a fixed interval.

4. The color gamut data creating device according to claim 2, wherein the plane setting unit includes:
a projecting unit configured to project the measurement points on a projecting plane that is perpendicular to the achromatic axis; and
a vertex determining unit, configured to determine a plurality of vertices of a polygon that is formed to encompass the measurement points projected onto the projecting plane;
wherein the plane setting unit sets the at least two target planes, each of which passes through one of the determined vertices.

5. The color gamut data creating device according to claim 2, wherein the plane setting unit further comprises a number determining unit configured to determine a number based on the difference calculated by the difference calculating unit,
wherein, if the difference is larger than the prescribed value, the plane adding unit adds at least one target plane, which divides an angular space between the one target plane and the another target plane and whose number is equal to the determined number.

6. The color gamut data creating unit according to claim 5, wherein the difference calculating unit further calculates a difference between a maximum saturation at a hue angle of a newly added target plane and a maximum saturation at a hue angle of another target plane that is located adjacent to the newly added target plane, and the plane adding unit further adds at least one target plane, which divides an angular space between the newly added target plane and the another target plane adjacent to the newly added target plane, if the calculated difference is larger than the prescribed value.

7. The color gamut data creating unit according to claim 4, further comprising:
a dividing unit configured to divide the color space into a plurality of lightness regions by at least one dividing plane that intersects the achromatic axis;
wherein the projecting unit projects measurement points located within each of the plurality of lightness regions onto the projecting plane,
wherein the vertex determining unit forms a plurality of polygons for a plurality of lightness regions, each polygon being formed to encompass the measurement points that are originally located in the corresponding lightness region and are projected on the projecting plane, and determines a plurality of vertices of the plurality of polygons,
wherein the plane setting unit sets the at least two target planes, each of which passes one of the plurality of determined vertices.

8. A color gamut data creating device comprising;
a receiving unit configured to receive measurement points concerning an image forming device, the measurement points being defined in a color space, the color space being represented by a cylindrical coordinate whose axis is set to a reference line, the cylindrical coordinate defining, as a radius, a distance from the reference line;
a target plane determining unit configured to determine a distribution of radius based on the measurement points, the target plane determining unit further configured to determine a plurality of target planes each of which includes the reference line, the distribution of radius defining a maximum radius reproducible by the image forming device at each of the plurality of target planes, a distribution of the plurality of target planes being varied to maintain a difference between a maximum radius on each target plane and a maximum radius on another target plane adjacent to the each target plane below a prescribed value; and
a color gamut creating unit configured to create color gamut data indicative of a distribution range of the measurement points projected on each target plane.

9. A color gamut data creating method comprising:
receiving measurement points concerning an image forming device, the measurement points being defined in a color spacer the color space having an achromatic axis and an axis perpendicular to the achromatic axis, the color space representing hue by a hue angle defined from the axis perpendicular to the achromatic axis, representing lightness along the achromatic axis, and representing saturation by a distance from the achromatic axis;
determining a saturation distribution based on the measurement points, the saturation distribution defining a maximum saturation reproducible by the image forming device at each of a plurality of hue angles;
determining a plurality of target planes, each target plane having a fixed hue angle and including the achromatic axis, a distribution of the plurality of target planes being varied to maintain a difference between a maximum saturation at a hue angle of each target plane and a maximum saturation at a hue angle of another target plane that is adjacent to the each target plane below a prescribed value;
projecting, on each target plane, those measurement points that are within a prescribed range relative to the subject target plane; and
creating color gamut data indicative of a distribution range of the measurement points projected on each target plane.

10. A non-transitory computer-readable storage medium storing a set of program instructions executable on a computer, the program instructions comprising:
receiving measurement points concerning an image forming device, the measurement points being defined in a color space, the color space having an achromatic axis and an axis perpendicular to the achromatic axis, the color space representing hue by a hue angle defined from the axis perpendicular to the achromatic axis, representing lightness along the achromatic axis, and representing saturation by a distance from the achromatic axis;
determining a saturation distribution based on the measurement points, the saturation distribution defining a maximum saturation reproducible by the image forming device at each of a plurality of hue angles;
determining a plurality of target planes, each target plane having a fixed hue angle and including the achromatic axis, a distribution of the plurality of target planes being varied to maintain a difference between a maximum saturation at a hue angle of each target plane and a maximum saturation at a hue angle of another target plane that is adjacent to the each target plane below a prescribed value;
projecting, on each target plane, those measurement points that are within a prescribed range relative to the subject target plane; and
creating color gamut data indicative of a distribution range of the measurement points projected on each target plane.

* * * * *